(12) United States Patent
Izawa et al.

(10) Patent No.: US 9,596,455 B2
(45) Date of Patent: Mar. 14, 2017

(54) IMAGE PROCESSING DEVICE AND METHOD, AND IMAGING DEVICE

(71) Applicant: FUJIFILM Corporation, Tokyo (JP)

(72) Inventors: Katsutoshi Izawa, Saitama (JP);
Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 353 days.

(21) Appl. No.: 14/493,879

(22) Filed: Sep. 23, 2014

(65) Prior Publication Data

US 2015/0009294 A1    Jan. 8, 2015

Related U.S. Application Data

(63) Continuation of application No. PCT/JP2013/055152, filed on Feb. 27, 2013.

(30) Foreign Application Priority Data

Mar. 28, 2012  (JP) .................................. 2012-073833

(51) Int. Cl.
*H04N 13/02* (2006.01)
*H04N 13/00* (2006.01)

(52) U.S. Cl.
CPC ....... *H04N 13/026* (2013.01); *H04N 13/0018* (2013.01); *H04N 13/021* (2013.01); *H04N 13/0207* (2013.01)

(58) Field of Classification Search
CPC ............. H04N 13/026; H04N 13/0207; H04N 13/0018; H04N 13/021

(Continued)

(56) References Cited

U.S. PATENT DOCUMENTS

| 2011/0122308 A1* | 5/2011 | Duparre | ............ H01L 27/14621 |
| | | | 348/340 |
| 2011/0134311 A1 | 6/2011 | Nagao | |
| 2012/0287252 A1* | 11/2012 | Tsuchida | .............. H04N 13/026 |
| | | | 348/56 |

FOREIGN PATENT DOCUMENTS

| JP | 5-7373 A | 1/1993 |
| JP | 7-182533 A | 7/1995 |

(Continued)

OTHER PUBLICATIONS

International Search Report for PCT/JP2013/055152 mailed on Apr. 16, 2013.

(Continued)

*Primary Examiner* — Allen Wong
(74) *Attorney, Agent, or Firm* — Birch, Stewart, Kolasch & Birch, LLP

(57) ABSTRACT

An image processing device comprising: an image acquisition device; a parallax information acquisition device; and a calculation device configured to calculate a first pixel and a second pixel for each pixel of the acquired image, the first digital filter and the second digital filter corresponding to the parallax information for each pixel of the acquired image, the first digital filter group and the second digital filter group being digital filter groups for giving a parallax to the acquired image and having left-right symmetry to each other, and each of the first digital filter group and the second digital filter group having filter sizes that are different depending on a magnitude of the parallax to be given, wherein the left-right symmetry of the first and second digital filter groups is different between a central part and an edge part of the image.

19 Claims, 18 Drawing Sheets

(58) Field of Classification Search
USPC .......................................................... 348/46
See application file for complete search history.

(56) References Cited

FOREIGN PATENT DOCUMENTS

| | | |
|---|---|---|
| JP | 10-155110 A | 6/1998 |
| JP | 2006-186795 A | 7/2006 |
| JP | 2006-191314 A | 7/2006 |
| JP | 2006-350642 A | 12/2006 |
| JP | 2010-515303 A | 5/2010 |
| JP | 2011-120143 A | 6/2011 |
| JP | 2011-164202 A | 8/2011 |
| JP | 2011-199502 A | 10/2011 |
| JP | 2011-259211 A | 12/2011 |
| WO | WO 2008/080156 A1 | 7/2008 |

OTHER PUBLICATIONS

Written Opinion of the International Searching Authority for PCT/JP2013/055152 mailed on Apr. 16, 2013.
International Preliminary Report on Patentability dated Oct. 9, 2014, issued in PCT/JP2013/055152 (Forms PCT/IB/326, PCT/IB/373, PCT/ISA/237 and PCT/IB/338).

* cited by examiner

FIG.7

(a) x-DIRECTIONAL AND y-DIRECTIONAL SENSITIVITY CHARACTERISTICS (b)

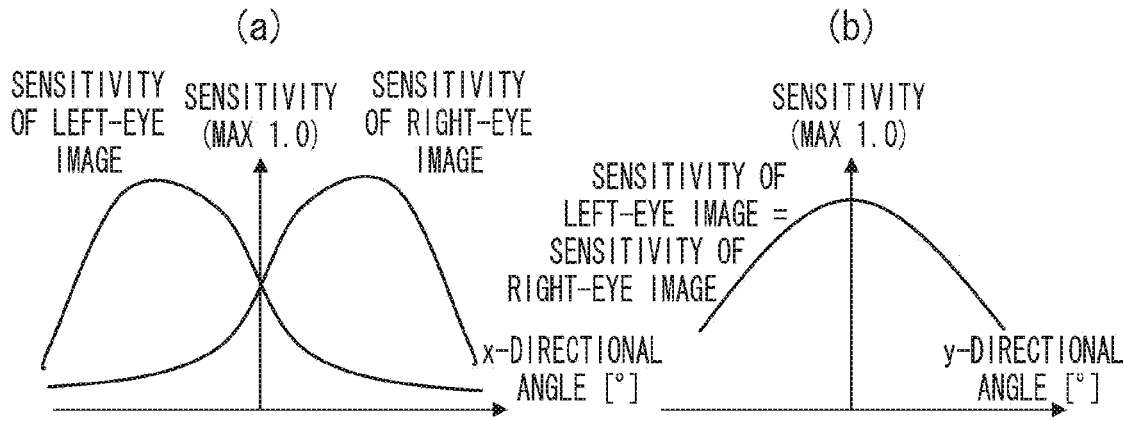

↓ COMBINE x-DIRECTIONAL AND y-DIRECTIONAL CHARACTERISTICS (c)

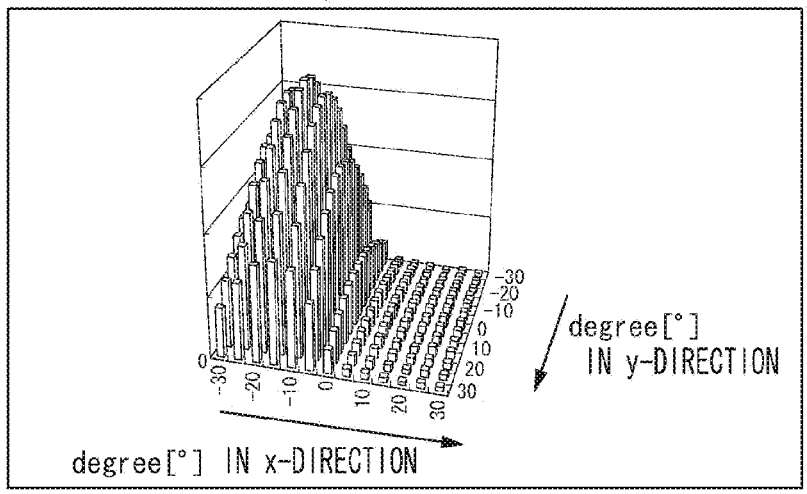

SENSITIVITY CHARACTERISTIC FOR EACH ANGLE

↓ CONVERT ANGLE INTO COORDINATES, ASSUMING THAT ONLY RANGE WITH CERTAIN DIAMETER R IS EXPOSED TO LIGHT (d)

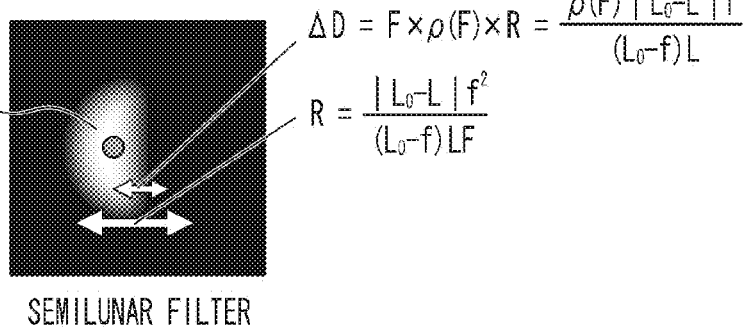

$$\Delta D = F \times \rho(F) \times R = \frac{\rho(F)\,|L_0-L|\,f^2}{(L_0-f)L}$$

$$R = \frac{|L_0-L|\,f^2}{(L_0-f)LF}$$

SEMILUNAR FILTER

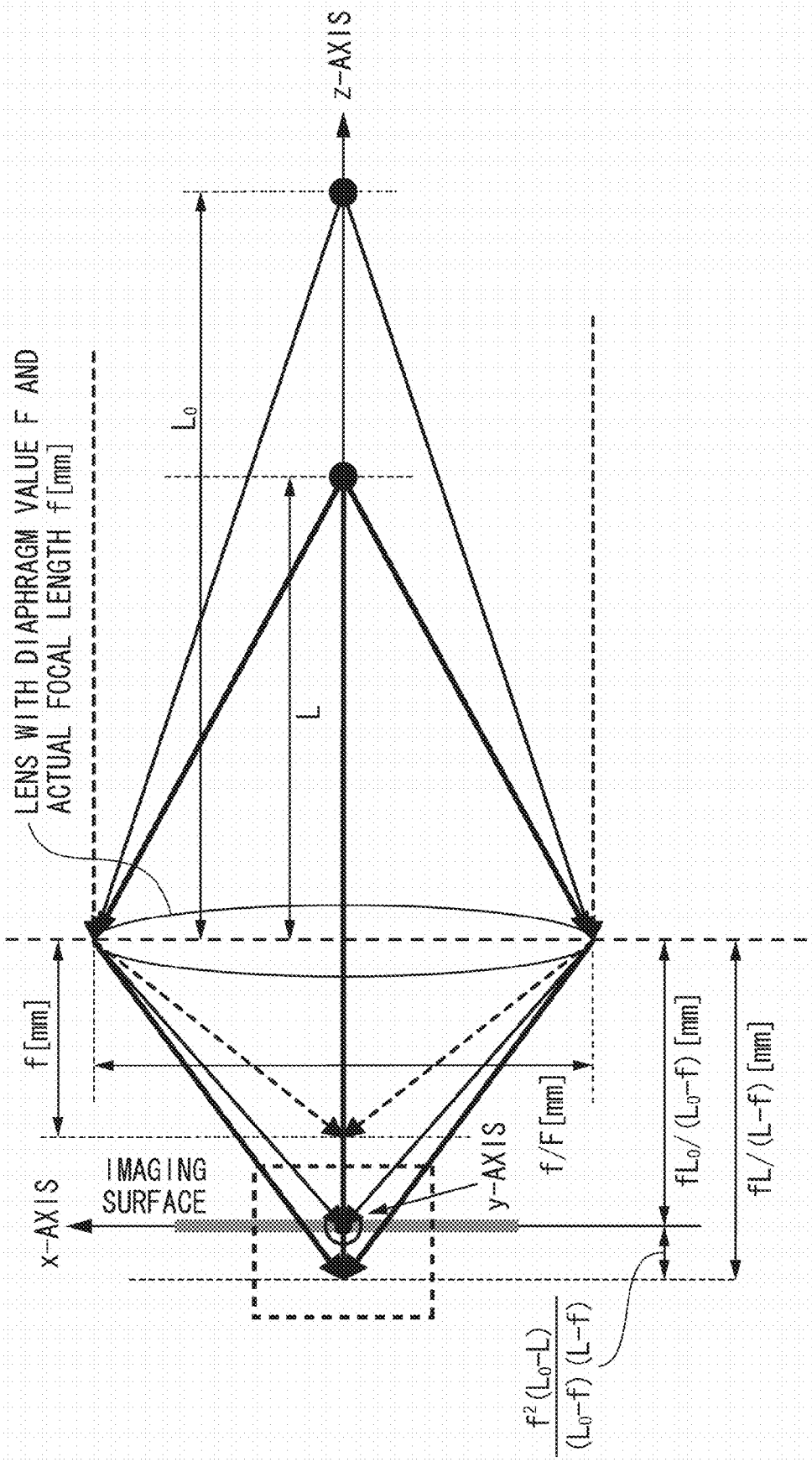

IMAGE PROCESSING DEVICE AND METHOD, AND IMAGING DEVICE

CROSS-REFERENCE TO RELATED APPLICATIONS

This application is a Continuation of PCT International Application No. PCT/JP2013/055152 filed on Feb. 27, 2013, which claims priority under 35 U.S.C §119 (a) to Japanese Patent Application No. 2012-73833 filed on Mar. 28, 2012. Each of the above application(s) is hereby expressly incorporated by reference, in its entirety, into the present application.

BACKGROUND OF THE INVENTION

Field of the Invention

The present invention relates to an image processing device and method, and an imaging device, and particularly relates to a technology for generating an image for stereovision, from a two-dimensional image.

Description of the Related Art

Conventionally, as technologies for changing a two-dimensional image into a three-dimensional image, technologies described in PTLs 1, 2 and 3 (Japanese Patent Application Laid-Open No. 2011-164202; Japanese Patent Application Laid-Open No. 07-182533; Japanese Patent Application Laid-Open No. 2010-515303) are known.

A stereoscope called a synopter is known as an optical device that displays the same picture to the left and right eyes and utilizes the principle of so-called monocular stereovision. An invention described in PTL 1 (Japanese Patent Application Laid-Open No. 2011-164202) adds a mask to an input image of a two-dimensional image, when displaying a 3D image converted from 2D by utilizing the principle of the monocular stereovision, in order to inhibit the decrease in display quality due to defect regions or invalid regions in the edge portion of a screen.

In a method described in PTL 2 (Japanese Patent Application Laid-Open No. 07-182533), from a two-dimensional image composed of a background image and a front image including a person image and the like in front of it, the front image is extracted, and the front image is moved in the horizontal direction, depending on the parallax and the perspective. Further, the moved front image is magnified such that a no-image-information region generated by the movement of the front image is compensated, and the front image and the background image are synthesized.

Further, in a method described in PTL 3 (Japanese Patent Application Laid-Open No. 2010-515303), two-dimensional input frames are classified into one of a flat image class and a non-flat image class. A frame in the flat image class is directly converted into a 3D stereo image. A frame classified into the non-flat image class is further processed automatically and adaptively, based on the complexity, so that a depth map is generated. Then, the conversion into a 3D stereo image is performed using the depth map.

Meanwhile, a so-called "miniature photograph generation" technology, in which an ordinarily imaged landscape photograph is processed as if a model was imaged at close range, is known (PTL 4; Japanese Patent Application Laid-Open No. 2011-120143). In the ordinarily imaged landscape photograph or the like, a blurring process is performed to the region other than a target region, and thereby, a miniature-like photograph is generated (FIG. 11 and FIG. 12 in PTL 4).

Moreover, a monocular 3D imaging device that, with a phase-difference CCD on which subject images having passed through left-right-directionally different regions of a single image-taking lens are pupil-divided and are formed respectively, performs the photoelectric conversions of the respective subject images having passed through the regions, and acquires a left-eye image and right-eye image (monocular 3D image) having a phase difference from each other depending on the focus deviation amount, is known (PTL 5; Japanese Patent Application Laid-Open No. 2011-199502).

SUMMARY OF THE INVENTION

In the principle of the monocular stereovision described in PTL 1, a single image is given to both eyes as parallel visual lines, and a monocular 3D image having a phase difference from each other depending on the focus deviation amount as described in PTL 5 is not generated.

In the inventions described in PTLs 2 and 3, a blurring process is not performed when a parallax is given, and therefore, there is a problem in that the eyes get tired easily when viewing a 3D image.

In the invention described in PTL 4, from an ordinarily imaged landscape photograph or the like, a miniature-like photograph can be generated, but cannot be generated as a 3D image.

A monocular 3D image to be taken by the monocular 3D image device described in PTL 5 has the advantage that a double image hardly appears even when being viewed through a 3D television with 3D-dedicated glasses taken off, as one of the advantages. However, there is a problem in that the monocular 3D image cannot be obtained only by the dedicated monocular 3D imaging device.

The present invention, which has been made in view of such circumstances, has an object to provide an image processing device and method, and an imaging device that make it possible to perform a parallax process and a blurring process to a two-dimensional image by a simple configuration, and to generate an image for stereovision in which a double image hardly appears even when being viewed with 3D-dedicated glasses taken off.

For achieving the object, an image processing device according to an aspect of the present invention includes: an image acquisition device configured to acquire an image; a parallax information acquisition device configured to acquire parallax information to be given to a pixel, for each pixel of the acquired image; and a calculation device configured to calculate a first pixel and a second pixel for each pixel of the acquired image, by performing a filtering process with a first digital filter and a second digital filter, based on a first digital filter group, a second digital filter group and the parallax information for each pixel acquired by the parallax information acquisition device, the first pixel and the second pixel being pixels to which a parallax has been given, the first digital filter and the second digital filter corresponding to the parallax information for each pixel of the acquired image, the first digital filter group and the second digital filter group being digital filter groups for giving a parallax to the acquired image and having left-right symmetry to each other, and each of the first digital filter group and the second digital filter group having filter sizes that are different depending a magnitude of the parallax to be given.

According to an aspect of the present invention, the first digital filter group and the second digital filter group that are digital filter groups for giving a parallax to an image (a two-dimensional image), that have left-right symmetry to each other, and whose filter sizes increase depending on at least the magnitude of the parallax to be given, are prepared. Then, for each pixel of the image to which the parallax is to be given, the filtering process is performed using a first digital filter and second digital filter corresponding to a parallax to be given to the pixel, and thereby, a process of giving the parallax and a blurring process are performed simultaneously. Note that for a pixel corresponding to a parallax of zero, the giving of a parallax and the blurring process are not performed. Further, the filter sizes of the first and second digital filters increase as the parallax increases, and therefore, the parallax to be given to the pixel increases, and the blurring amount also increases. The image for stereovision to which the giving of a parallax and the blurring process have been performed in this way allows for stereovision by being displayed on a 3D display, and is a natural stereoscopic image that does not make the eyes get tired easily, because the blur amount increases as the parallax increases.

In an image processing device according to an alternative aspect of the present invention, it is preferable that the left-right symmetry of the first and second digital filter groups be different between a central part and an edge part of the image.

In an image processing device according to a further alternative aspect of the present invention, it is preferable that the image processing device include a parallax map acquisition device configured to acquiring a parallax map that indicates the parallax to be given to the acquired image, and, for each pixel of the acquired image, the parallax information acquisition device acquire the parallax information corresponding to a position of the pixel, from the parallax map.

In an image processing device according to a further alternative aspect of the present invention, it is preferable that the first digital filter group and the second digital filter group be calculated based on a sensitivity characteristic of a single imaging element, the sensitivity characteristic depending on an incidence angle, the single imaging element being configured by a first pixel group and a second pixel group, the first pixel group and the second pixel group respectively receiving light fluxes into which light flux having passed through a single image-taking optical system is pupil-divided.

In an image processing device according to a further alternative aspect of the present invention, it is preferable that the first digital filter group and the second digital filter group have such filter coefficients that an image resulting from adding a first image and a second image does not become a double image, the first image and the second image being images to which the parallax after the filtering process by the calculation device has been given. Thereby, even when being viewed with 3D-dedicated glasses taken off, the image for stereovision displayed on the 3D display can be viewed as a two-dimensional image in which a double image hardly appears.

In an image processing device according to a further alternative aspect of the present invention, it is preferable that the first digital filter group and the second digital filter group each have normalized filter coefficients. Thereby, it is possible to prevent the change in the brightness of the image after the filtering process.

An image processing device according to a further alternative aspect of the present invention includes a parallax map storage device configured to store a parallax map that is previously defined depending on a position on the image, and the parallax map acquisition device acquires the parallax map from the parallax map storage device. Thereby, even when an image does not have a parallax map, the image for stereovision can be generated by applying the previously defined parallax map. For example, the parallax can be defined such that the parallax in the jumping-out direction increases as closing to the bottom of the image to which the parallax is to be given, and the parallax can be defined such that the parallax in the depth direction increases as closing to the top. Further, by defining the parallax such that the parallax decreases at a specific region in the image to which the parallax is to be given, and the parallax increases at the region other than the specific region (the blurring amount also increases), it is possible to generate a miniature-like 3D photograph.

In an image processing device according to a further alternative aspect of the present invention, it is preferable that the image processing device include a device configured to acquire information indicating a top-bottom direction of the image to which the parallax is to be given, and, in the acquisition of the parallax map from the parallax map storage device, the parallax map acquisition device acquire a corresponding parallax map, based on the information indicating the top-bottom direction of the acquired image. Thereby, even when the image to which the parallax is to be given is a laterally-photographed or longitudinally-photographed image, it is possible to give an appropriate parallax.

An imaging device according to a further alternative aspect of the present invention includes: an imaging device including an image-taking optical system, and an imaging element on which a subject image is formed through the image-taking optical system; the image acquisition device configured to acquire an image that is output from the imaging device; and the above-described image processing device.

An imaging device according to a further alternative aspect of the present invention includes a length information acquisition device configured to acquire length information for each of multiple regions of a picked-up image or for each pixel of the picked-up image, when the image is picked up by the imaging device, and the parallax information acquisition device acquires the parallax information of the picked-up image, based on the acquired length information. As the length information acquisition device, anything may be adopted if it allows for a multi-point length measurement.

An imaging device according to a further alternative aspect of the present invention includes a phase difference detection device configured to detect a phase difference for each of multiple regions of an image picked up by the imaging device or for each pixel of the image, and the parallax information acquisition device acquires the parallax information of the picked-up image, based on the phase difference detected by the phase difference detection device.

An imaging device according to a further alternative aspect of the present invention further includes another imaging device including an image-taking optical system and an imaging element and being different from the imaging device, and the parallax information acquisition device acquires the parallax information of the picked-up image, based on two images picked up by the two imaging device.

An image processing method according to a further alternative aspect of the present invention includes: an image acquisition step for acquiring an image; a parallax information acquisition step for acquiring parallax information to be given to a pixel, for each pixel of the acquired image; and a calculation step for calculating a first pixel and a second pixel for each pixel of the acquired image, by performing a filtering process with a first digital filter and a second digital filter, based on a first digital filter group, a second digital filter group and the parallax information for each pixel acquired by the parallax information acquisition step, the first pixel and the second pixel being pixels to which a parallax has been given, the first digital filter and the second digital filter corresponding to the parallax information for each pixel of the acquired image, the first digital filter group and the second digital filter group being digital filter groups for giving a parallax to the acquired image and having left-right symmetry to each other, and each of the first digital filter group and the second digital filter group having filter sizes that increase depending on at least a magnitude of the parallax to be given.

According to the present invention, a first digital filter group and a second digital filter group that are digital filter groups for giving a parallax to an image (a two-dimensional image), that have left-right symmetry to each other, and whose filter sizes increase depending on the magnitude of the parallax to be given, are prepared, and, for each pixel of the image to which the parallax is to be given, a filtering process is performed using an appropriate first digital filter and second digital filter. Therefore, a process of giving the parallax and a blurring process can be performed simultaneously. The image for stereovision to which the giving of the parallax and the blurring process have been performed in this way allows for stereovision by being displayed on a 3D display, and is a natural stereoscopic image that does not make the eyes get tired easily, because the blur amount increases as the parallax increases. Moreover, the image for stereovision displayed on the 3D display is an image in which a double image hardly appears, even when being viewed with 3D-dedicated glasses taken off.

BRIEF DESCRIPTION OF THE DRAWINGS

FIG. 7 is a diagram showing the sensitivity characteristic of the monocular 3D imaging element and a semilunar filter to be created corresponding to the sensitivity characteristic.

FIG. 8 is a diagram to be used for explaining a creation method of a semilunar filter.

DETAILED DESCRIPTION OF THE PREFERRED EMBODIMENTS

Hereinafter, embodiments of an image processing device and method and an imaging device according to the present invention are explained with reference to the accompanying drawings.

[Imaging Device]

Figure 1:
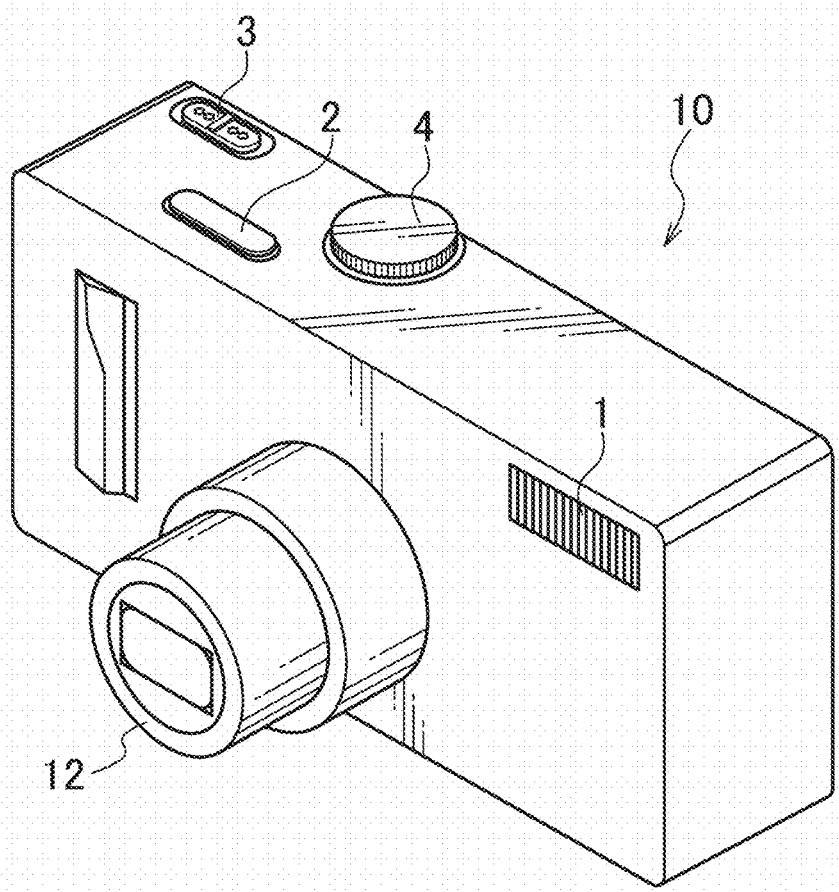
FIG. 1 is a perspective view showing an embodiment of an imaging device according to the present invention.
Figure 2:
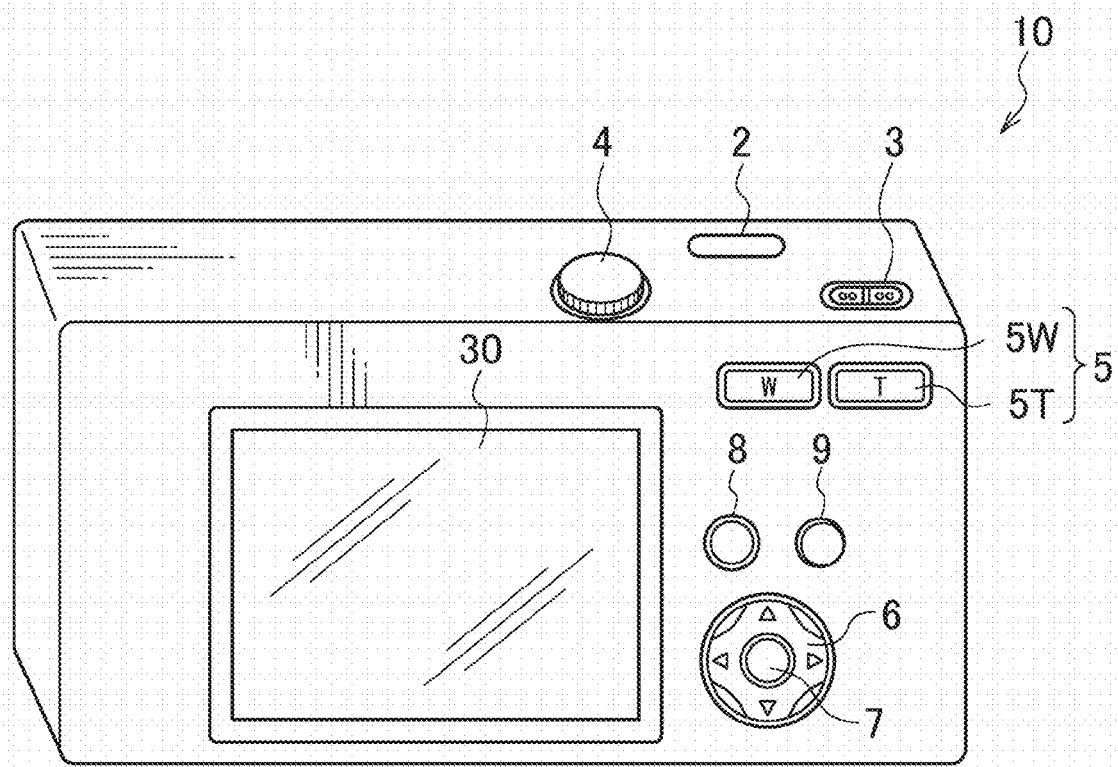
FIG. 2 is a back view of the imaging device shown in FIG. 1.

FIG. 1 and FIG. 2 are a perspective view and a back view showing an embodiment of an imaging device according to the present invention, respectively. This imaging device 10 is a digital camera that receives the light having passed through a lens with an imaging element, converts it into a digital signal, and records it in a recording medium.

As shown in FIG. 1, in the imaging device 10, an image-taking lens (image-taking optical system) 12, a strobe 1 and the like are provided on the front surface, and a shutter button 2, a power/mode switch 3, a mode dial 4 and the like are provided on the top surface. On the other hand, as shown in FIG. 2, a 3D liquid crystal monitor 30 for 3D display, a zoom button 5, a cross button 6, a MENU/OK button 7, a playback button 8, a BACK button 9 and the like are provided on the back surface of the camera.

The image-taking lens 12, which is constituted by a collapsible zoom lens, extends from the camera body, when the mode of the camera is set to an image-taking mode by the power/mode switch 3. The strobe 1 emits strobe light toward a main subject.

The shutter button 2 is configured as a two-step stroke type switch that allows for a so-called "half-push" and "full-push". When the stereoscopic imaging device 10 is driven as the image-taking mode, the AE/AF is activated by performing the "half-push" of the shutter button 2, and an image taking is executed by performing the "full-push". Further, when the stereoscopic imaging device 10 is driven as the image-taking mode, an image taking is executed by performing the "full-push" of the shutter button 2.

Note that the shutter button 2 is not limited to a form of the two-step stroke type switch that allows for the half-push and the full-push, and may output a S1-on signal and a S2-on signal by one-time operation, or may be provided with switches separated from each other to output the S1-on signal and the S2-on signal.

Further, in a form in which an operation instruction is performed by a touch type panel and the like, by touching a region corresponding to an operation instruction that is displayed on the screen of the touch type panel as their operation unit, the operation instruction may be output. In the present invention, the form of the operation unit is not limited to these, if the instructions of the image-taking preparation process and the image-taking process can be performed. Further, the image-taking preparation process and the image-taking process may be successively executed by an operation instruction to a single operation unit.

The power/mode switch 3 has both of a function as a power switch for performing the ON/OFF of the power of the stereoscopic imaging device 10 and a function as a mode switch for setting the mode of the stereoscopic imaging device 10, and is provided so as to be able to slide among an "OFF position", a "playback position" and an "image-taking position". In the stereoscopic imaging device 10, when the power/mode switch 3 is slid and placed to the "playback position" or the "image-taking position", the power is turned on, and when it is placed to the "OFF position", the power is turned off. Then, when the power/mode switch 3 is slid and placed to the "playback position", the "playback mode" is set, and when it is placed to the "image-taking position", the "image-taking mode" is set.

The mode dial 4 functions as an image-taking mode setting device configured to set the image-taking mode of the imaging device 10, and, depending on the setting position of this mode dial, the image-taking mode of the stereoscopic imaging device 10 is set to various modes. For example, there are a "plane image taking mode" for taking a plane image, a "stereoscopic image taking mode" for taking a stereoscopic image (3D image), a "moving image taking mode" for taking a moving image, and the like.

A 3D liquid crystal monitor 30 is a stereoscopic display device that can display a stereovision image (a left-eye image and a right-eye image) with a parallax barrier, as oriented images having predetermined orientations respectively. When a stereovision image is input to the 3D liquid crystal monitor 30, a parallax barrier having a pattern in which light transmitting parts and light blocking parts are alternately arrayed at a predetermined pitch is generated on a parallax barrier display layer of the 3D liquid crystal monitor 30, and strip-shaped image fragments showing the left and right pictures are alternately arranged and displayed on an image display surface of the lower layer. In the case of being utilized as a display panel for a plane image or a user interface, nothing is displayed on the parallax barrier display layer, and a single piece of image is displayed with no change on the image display surface of the lower layer. Here, the form of the 3D liquid crystal monitor 30 is not limited to this, and if displaying a left-eye image and a right-eye image such that they can be recognized as a stereoscopic image, it is allowable to be a form in which a lenticular lens is used, or a form in which the left-eye image and the right-eye image can be individually viewed by putting dedicated glasses such as polarization glasses or liquid-crystal shutter glasses.

The zoom button 5 functions as a zoom instruction device configured to give an instruction of the zoom, and includes a tele-button 5T for giving an instruction of the telescopic-side zoom and a wide-button 5W for giving an instruction of the wide-side zoom. In the imaging device 10, when the tele-button 5T and the wide-button 5W are operated in the image-taking mode, the focal length of the image-taking lens 12 is changed. Further, when the tele-button 5T and the wide-button 5W are operated in the playback mode, the playing image is magnified or demagnified.

The cross button 6 is an operation unit for inputting instructions for four directions: the upward direction, the downward direction, the leftward direction and the rightward direction, and functions as a button (a cursor-movement operation device) for selecting an item from a menu screen, or for giving instructions of selections of various setting items from each menu. The left/right key functions as a frame advance (forward directional/backward directional advance) button in the playback mode.

The MENU/OK button 7 is an operation key having both of a function as a menu button for commanding the display of a menu on the screen of the 3D liquid crystal monitor 30 and a function as an OK button for commanding the decision and execution of the selected content, or the like.

The playback button 8 is a button for the switching to the playback mode, in which a still image or moving image of a taken and recorded stereoscopic image (3D image) or plane image (2D image) is displayed on the 3D liquid crystal monitor 30.

The BACK button 9 functions as a button for giving an instruction of the cancel of an input operation or the restoration to the last operation state.

[Internal Configuration of Imaging Device]

Figure 3:
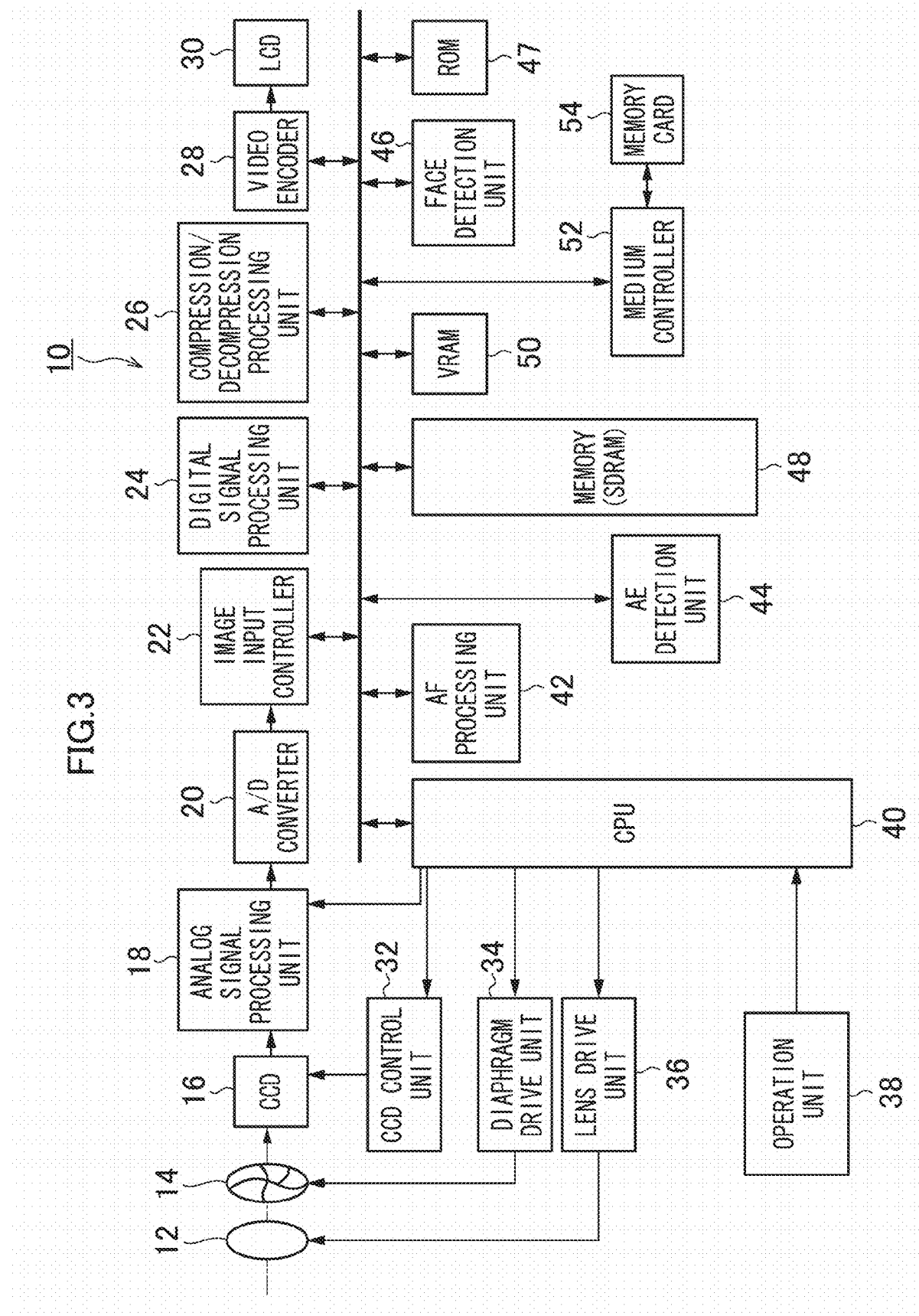
FIG. 3 is a block diagram showing an embodiment of the internal configuration of the imaging device shown in FIG. 1.

FIG. 3 is a block diagram showing an embodiment of the internal configuration of the above imaging device 10. The imaging device 10 records a picked-up image in a memory card 54, and the operation of the whole device is integrally controlled by a central processing unit (CPU) 40.

The imaging device 10 is provided with an operation unit 38 such as the shutter button, the mode dial, the playback button, the MENU/OK key, the cross key, the zoom button and the BACK key. A signal from the operation unit 38 is input to the CPU 40. Based on the input signal, the CPU 40 controls each circuit of the imaging device 10, and performs, for example, the lens drive control with a lens drive unit 36, the diaphragm drive control with a diaphragm drive unit 34, the image-taking operation (from the half-push of the shutter button 2 to the completion of the image recording) control with a CCD control unit 32, the image processing control with a digital signal processing unit 24, the recording/playing control of image data with a compression/decompression processing unit 26, the display control of the 3D liquid crystal monitor 30 with a video encoder 28, and the like.

When the power of the stereoscopic imaging device 10 is turned on by the power/mode switch 3, a power unit, which is not shown in the figure, supplies electricity to each block, and the drive of the stereoscopic imaging device 10 starts.

The light flux having passed through the image-taking lens 12, the diaphragm 14 and the like forms an image on the imaging element 16 (an imaging device, an image acquisition device) that is a CCD image sensor, and signal charges are accumulated in the imaging element 16. The signal charges accumulated in the imaging element 16 are read as a voltage signal corresponding to the signal charges, based on a reading signal to be given from the CCD control unit 32. The voltage signal read from the imaging element 16 is given to an analog signal processing unit 18. Here, the imaging element 16 according to the embodiment is a CCD image sensor, but is not limited to this, and may be a CMOS type image sensor.

The analog signal processing unit 18 performs, to the voltage signal output from the imaging element 16, a correlated double sampling process (a process for obtaining accurate pixel data by acquiring the difference between the level of feed through components and the level of pixel signal components contained in the output signal for each pixel of the imaging element 16, with the aim of reducing noises (particularly, thermal noises) and the like contained in the output signal of the imaging element 16). Thereby, the R, G and B signals for each pixel are sampled and held, and, after amplification, are given to an A/D converter 20. The A/D converter 20 sequentially converts the input R, G and B signals into R, G and B digital signals, and outputs them to an image input controller 22.

To the digital image signals input through the image input controller 22, a digital signal processing unit 24 performs predetermined signal processes such as an offset process, a white balance correction, a gain control process including a sensitivity correction, a gamma correction process, a demosaicing process, a YC process and an edge enhancement process.

Further, the digital signal processing unit 24 functions as a parallax map acquisition device configured to acquire a parallax map that is created in association with a taken image, and as a calculation device configured to perform the giving of a parallax and the blurring process (filtering process) and calculating a pixel that has a parallax and a blur, and, to 2D image data, performs the parallax process and the blurring process according to the present invention, to generate images for stereovision (left-eye images and right-eye images) that are different in parallax. Note that the details of the image processing method for generating a left-eye image and a right-eye image from a 2D image are described later.

The 2D or 3D image data processed by the digital signal processing unit 24 are input to a VRAM 50. The VRAM 50 includes an A region and a B region for recording image data each of which shows a 2D or 3D image for one frame. In the VRAM 50, the image data showing a 2D or 3D image for one frame are rewritten alternately in the A region and the B region. The written image data are read from the region other than a region in which image data are being rewritten, of the A region and B region in the VRAM 50.

The 2D or 3D image data read from the VRAM 50 are encoded in a video encoder 28, and then, are output to the 3D liquid crystal monitor 30 provided on the back surface of the camera. Thereby, 2D or 3D subject images are continuously displayed on the display screen of the 3D liquid crystal monitor 30.

When the first-step push (half-push) of the shutter button 2 of the operation unit 38 is performed, the CDC 40 starts the AF operation and the AE operation, moves the focus lens in the optical axis direction through the lens drive unit 36, and performs such a control that the focus lens comes to the focusing position.

The AF processing unit 42 is a part for performing a contrast AF process or a phase-difference AF process. In the case of performing the contrast AF process, for at least one image of the left-eye image and the right-eye image, high frequency components of the image in a predetermined focus region are extracted, and an AF evaluation value indicating a focusing state is calculated by integrating the high frequency components. The focus lens in the image-taking lens 12 is moved to such a lens position that the AF evaluation value is maximized, and thereby, the AF control (contrast AF) is performed. When a 3D image is taken and recorded, the AF processing unit 42 performs the contrast AF for each of divided regions, which are multiple regions by the division of the whole screen, and performs a multi-point length measurement in which the subject length from the lens position to maximize the AF evaluation value is measured for each of the divided regions.

In response to the zoom command from the zoom button 5, the CPU 40 advances or retreats the zoom lens in the optical axis direction through the lens drive unit 36, and changes the focal length.

Further, at the time of the half-push of the shutter button 2, the image data output from the A/D converter 20 are taken in an AE detection unit 44.

The AE detection unit 44 integrates the G signals in the whole screen, or integrates the G signals that are weighted differently between the central part and edge part of the screen, and outputs the integrated value to the CPU 40. The CPU 40 calculates the brightness (image-taking Ev value) of the subject, from the integrated value input by the AE detection unit 44, and based on the image-taking Ev value, determines the F-value of the diaphragm 14 and the electronic shutter (shutter speed) of the imaging element 16, in accordance with a predetermined program chart.

Note that in FIG. 3, reference numeral 46 designates a known face detection unit for detecting the face of a person in an image-taking angular filed and setting an area containing the face as an AF area and an AE area. The face is not limited to the face of a person, and includes the face of an animal such as a pet. Further, as the face detection method, a method of performing the detection using a dictionary in which multiple pieces of image information have been registered in advance, and a method of performing the detection using a template matching (image matching) can be applied.

Further, reference numeral 47 designates a ROM (EEPROM) (a parallax map storage device) in which an image processing program for generating the left-eye image and right-eye image according to the present invention, first and second digital filter groups to be used for generating a stereovision image, a parallax map and the like are stored in addition to a camera control program, the defect information of the imaging element 16, and various parameters or tables to be used for image processes and the like. Note that the details of the image processing program according to the present invention and the like are described later.

When the AE operation and AF operation by the half-push of the shutter button 2 is finished and the second-step push (full-push) of the shutter button is performed, in response to the push, and that are output from the A/D converter 20 are input from the image input controller 22 to a memory (SDRAM) 48, and are temporarily stored.

The image data temporarily stored in the memory 48 are appropriately read by the digital signal processing unit 24, and here, predetermined signal processes including the demosaicing process, an image process for edge enhancement, and a YC process (a generation process of luminance data and color difference data of the image data) are performed. The image data (YC data) after the YC process are stored in the memory 48, again. The demosaicing process is a process of calculating all color information for each pixel from a mosaic image corresponding to the color filter arrangement of a single-plate-type color imaging element, and is also called the synchronization process. For example, in the case of an imaging element including color filters of three colors of RGB, the process is a process of calculating, for each pixel, color information about all of RGB, from a mosaic image of RGB.

The YC data stored in the memory 48 are output to a compression/decompression processing unit 26, and, after the execution of a predetermined compression process such as JPEG (joint photographic experts group), are stored in the memory 48, again. From the YC data (compressed data) stored in the memory 48, an image file is generated, and the image file is read by a medium controller 52, and is stored in the memory card 54.

Although the imaging device 10 having the above configuration includes the function for generating a 3D image from a 2D image, the other parts are the same as the conventional one.

[Image Processing Method for Generating 3D Image from 2D Image]

Next, an image processing method for generating a 3D image from a 2D image according to the present invention is explained with reference to FIG. 4 and FIG. 5.

Figure 4:
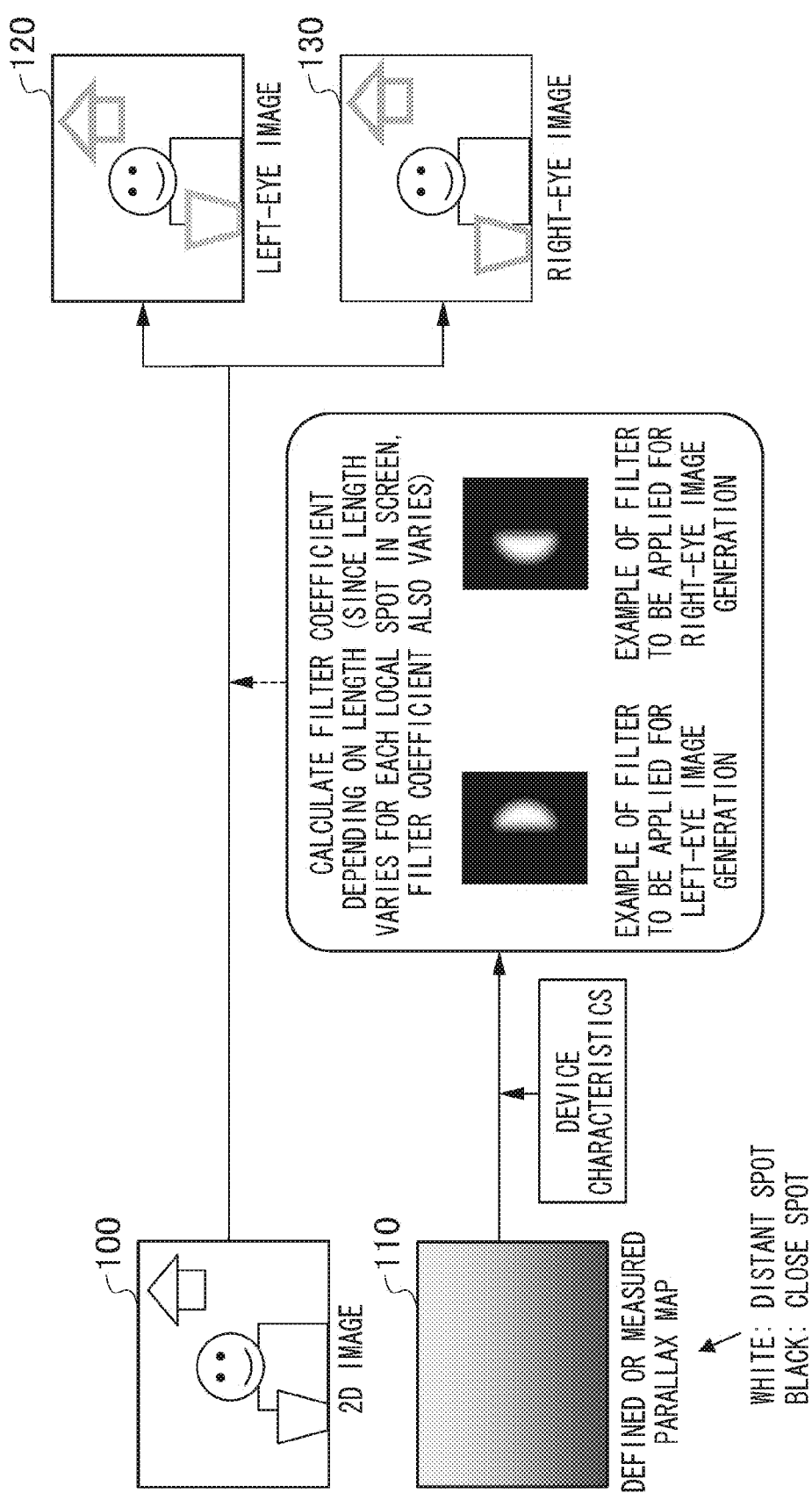
FIG. 4 is a conceptual diagram showing an image processing method for generating a 3D image from a 2D image.

FIG. 4 is a conceptual diagram showing an image processing method for generating a 3D image from a 2D image.

As shown in FIG. 4, first, a 2D image 100 to which a parallax of left and right viewpoints is to be given, and a parallax map 110 that is the criterion for giving a parallax to the 2D image and that is previously defined, or is calculated from multi-point length measurement data measured at the time of taking the 2D image to which a parallax is to be given, are acquired. Here, in the parallax map 110, the deviation (parallax) of pixels between corresponding points of a left-eye image and a right-eye image is mapped throughout the screen. In FIG. 4, the white part of the parallax map 110, which is shown with a gray scale, shows the parallax for distant spots, and the black part shows the parallax for close spots.

Meanwhile, a first digital filter group for generating a left-eye image and a second digital filter group for generating a right-eye image, which are digital filter groups for performing the giving of a parallax and the blurring process for each pixel of the 2D image, are previously prepared, and stored in the memory.

Figure 5:
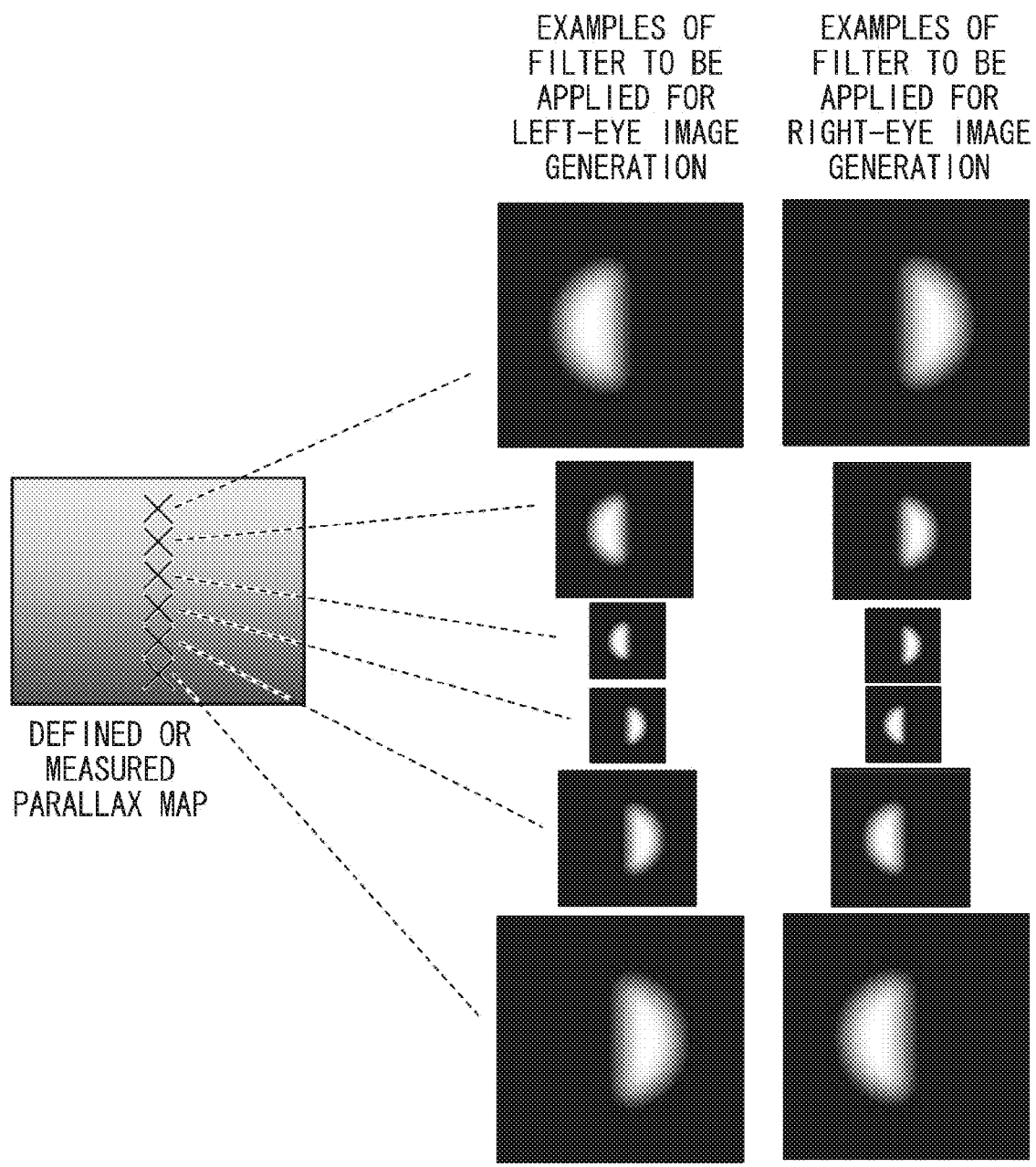
FIG. 5 is a diagram showing left and right semilunar filters that are applied corresponding to parallaxes to be given.

As shown in FIG. 5, the first digital filter group and the second digital filter group have left-right symmetry to each other, and the filter size is different depending on the magnitude of the parallax to be given. The filter shapes of the first digital filter group and the second digital filter group are not always shapes that are line-symmetric with respect to a line passing through the center of a circle, and include shapes that have a rough symmetry, for example, include shapes in which a circle is divided into two by a straight line passing through a position deviated from the center of the circle in the left-right direction. Further, in the first digital filter group and second digital filter group shown in FIG. 5, a first digital filter and a second digital filter to be respectively selected depending on the parallax have semilunar shapes, which become a circle shape by being overlapped. This is because they correspond to shapes into which a diaphragm opening (circle shape) is pupil-divided in the left-right direction. Therefore, the shapes of first and second digital filters corresponding to a pentagonal diaphragm opening are respectively shapes into which a pentagon is pupil-divided in the left-right direction.

In FIG. 4, when pixels of a left-eye image and a right-eye image are generated from an arbitrary pixel of the 2D image 100, the parallax information corresponding to the pixel is acquired from the parallax map 110, and a first digital filter and second digital filter corresponding to the parallax information are read from the memory. Then, the convolution operation (product-sum operation) between a pixel group centered on the arbitrary pixel corresponding to the filter sizes of the first digital filter and second digital filter and the filter coefficient of the first digital filter is performed, and thereby, the pixel of the left-eye image is calculated. Similarly, the convolution operation between a pixel group centered on the arbitrary pixel corresponding to the filter sizes of the first digital filter and second digital filter and the filter coefficient of the second digital filter is performed, and thereby, the pixel of the right-eye image is calculated. Thereby, for the arbitrary pixel, the process of giving a parallax (phase shift) and the blurring process are performed simultaneously.

The above image process is performed for all the pixels of the 2D image, and thereby, a left-eye image 120 and a right-eye image 130 are generated.

Note that as shown in FIG. 5, in the first digital filter group and the second digital filter group, when the parallax is zero, the filter sizes are minimized (for example, 1), and the filtering process is not substantially performed. Then, as the parallax increases, the filter sizes increases so that the blur also increases. The shapes of the first digital filter and second digital filter are opposite between the parallax at the distant side and the parallax at the close side. This is because the parallax directions are opposite between the parallax at the distant side and the parallax at the close side.

[Digital Filter to Perform Giving of Parallax and Blurring Process]

Next, digital filters to perform the giving of a parallax and the blurring process to the 2D image are described in detail.

Figure 6:
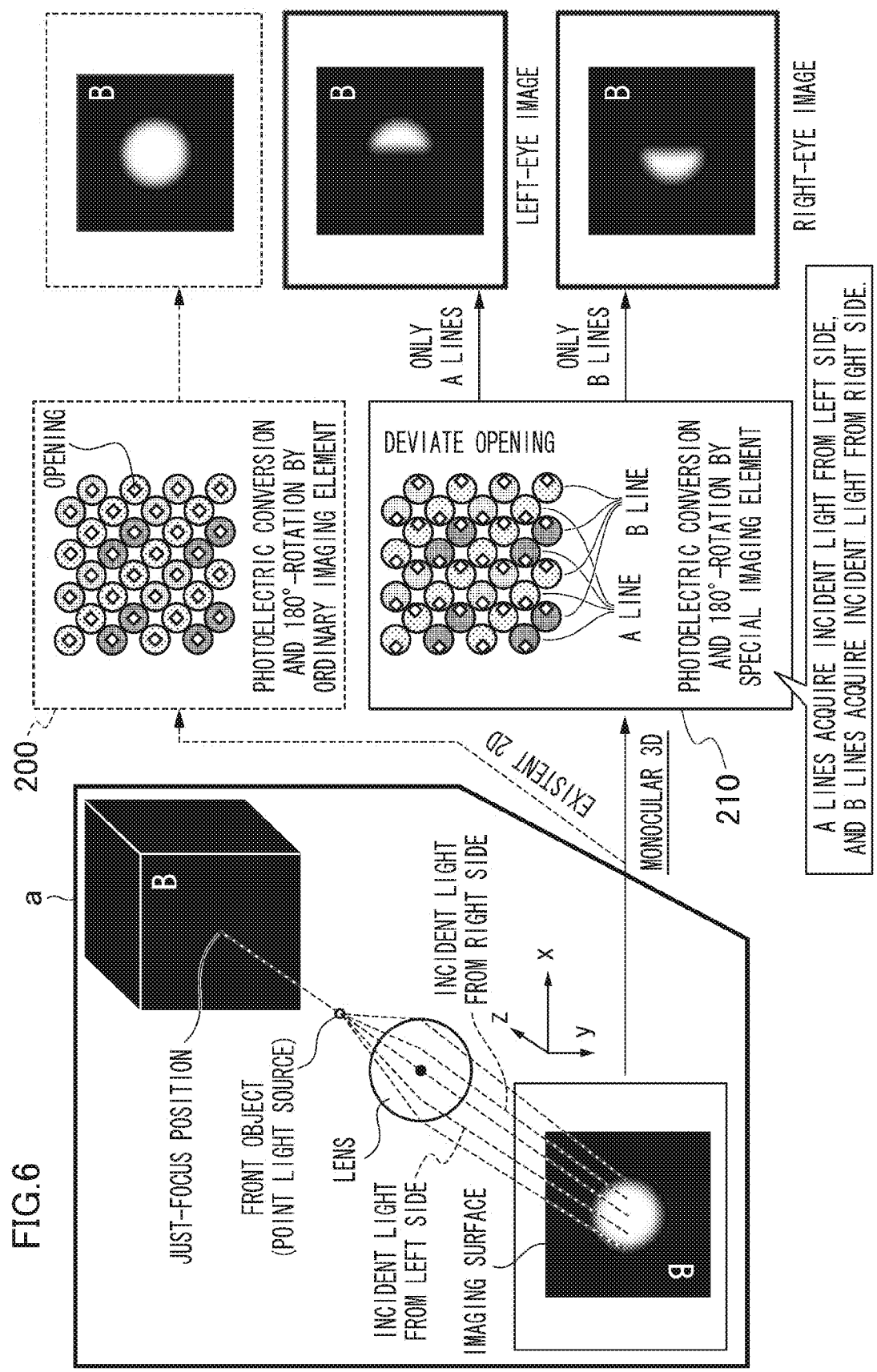
FIG. 6 is a diagram to be used for explaining an image that is picked up by an ordinary imaging element, and a left-eye image and right-eye image that are picked up by a monocular 3D imaging element.

FIG. 6 is a diagram showing how the image of an object (point light source) a in front of the focus position is taken, with the focus of a lens adjusted on the front surface of the object, and shows an image to be picked up by an ordinary imaging element 200, and a left-eye image and right-eye image to be picked up by a special imaging element (a monocular 3D imaging element) 210. Note that in the imaging elements 200 and 210 in FIG. 6, the light receiving surfaces viewed from the subject side are shown, respectively.

In the ordinary imaging element 200, pixels on odd lines (also referred to as main-pixels or A-plane pixels) and pixels on even lines (referred to as sub-pixels or B-plane pixels), each of which are arranged in a matrix, are disposed so as to be deviated from each other by one-half pitches in the horizontal and vertical directions, and an image (A-plane image) composed of the A-plane pixels and an image (B-plane image) composed of the B-plane pixels each have color filters in the Bayer array. From these A-plane image and B-plane image, a single piece of high-resolution image can be generated. Note that openings to be entered by light, which are provided so as to correspond to the A-plane pixels and B-plane pixels of the ordinary imaging element 200, are formed at the centers of the respective pixels. Further, micro-lenses not shown in the figure are provided on the respective pixels.

The image of the point light source in front of the focus position that is obtained from the ordinary imaging element 200 involves a rear-focus, and forms a circle with a diameter equivalent to the blur amount.

On the other hand, in the monocular 3D imaging element 210, openings formed on the A-plane pixels and openings formed on the B-plane pixels are biased in the left and right directions, respectively. The light having passed through the left-side region of the lens enter the A-plane pixels, and the light having passed through the right-side region of the lens enter the B-plane pixels. The monocular 3D imaging element 210 is a known phase-difference image sensor, and the details are described in PTL 5 and the like.

An image (A-plane image) composed of the A-plane pixels of the monocular 3D imaging element 210 having the above configuration is a left-eye image, and an image (B-plane image) composed of the B-plane pixels is a right-eye pixel.

The image of the point light source in front of the focus position that is obtained from the monocular 3D imaging element 210 involves a rear-focus, and the left-eye image and the right-eye image have semilunar shapes with diameters equivalent to the respective blur amounts. Then, the deviation amount between the centroid of the semilunar left-eye image and the centroid of the right-eye image is the parallax amount of the image of the point light source. That is, as for the image of the point light source in front of the focus position, if the characteristic (the sensitivity for each angle) of the imaging element 210 is already known, it is possible to know what left-eye and right-eye filters (the above-described first digital filter and second digital filter) are convoluted to the point light source. Note that the left-eye and right-eye filters, which have semilunar shapes, are referred to as "semilunar filters", hereinafter.

Now, the (a) portion of FIG. 7 shows an example of the sensitivities of the left-eye image and right-eye image for an x-directional angle [°] of the light that enters the monocular 3D imaging element 210 through the lens shown in FIG. 6, and the (b) portion of FIG. 7 shows an example of the sensitivities of the left-eye image and right-eye image for a y-directional angle [°].

As shown in the (a) portion of FIG. 7, the sensitivities of the left-eye image and right-eye image for the x-directional angle [°] have a symmetry centered on an angle of zero, and the peak positions of the sensitivities are deviated. Further, as shown in the (b) portion of FIG. 7, the sensitivities of the left-eye image and right-eye image for the y-directional angle [°] coincide, and the peak positions of the sensitivities are at an angle of zero.

When combining the x-directional and y-directional sensitivity characteristics shown in the (a) and (b) portions of FIG. 7, the sensitivity characteristic for each of the x-directional and y-directional angles of the light to enter the imaging element 210 is obtained as shown in the (c) portion of FIG. 7. Note that the (c) portion of FIG. 7 shows the sensitivity characteristic for each angle of the A-plane pixel corresponding to the left-eye image of the imaging element 210.

Next, as shown in the (d) portion of FIG. 7, assuming that only a range with a certain diameter R on the imaging element 210 is exposed to light, when the angles are converted into coordinates by the x-axis (lateral direction) and y-axis (longitudinal direction) of the imaging element 210, the length between the centroids of the left and right semilunar filters (that is, the parallax ΔD), and the diameter R of the semilunar filters can be expressed by the following formulas, respectively.

$$\Delta D = \frac{\rho(F)|L_o - L|f^2}{(L_o - f)L} \quad \text{[Formula 1]}$$

$$R = \frac{|L_o - L|f^2}{(L_o - f)LF} \quad \text{[Formula 2]}$$

Figure 9:
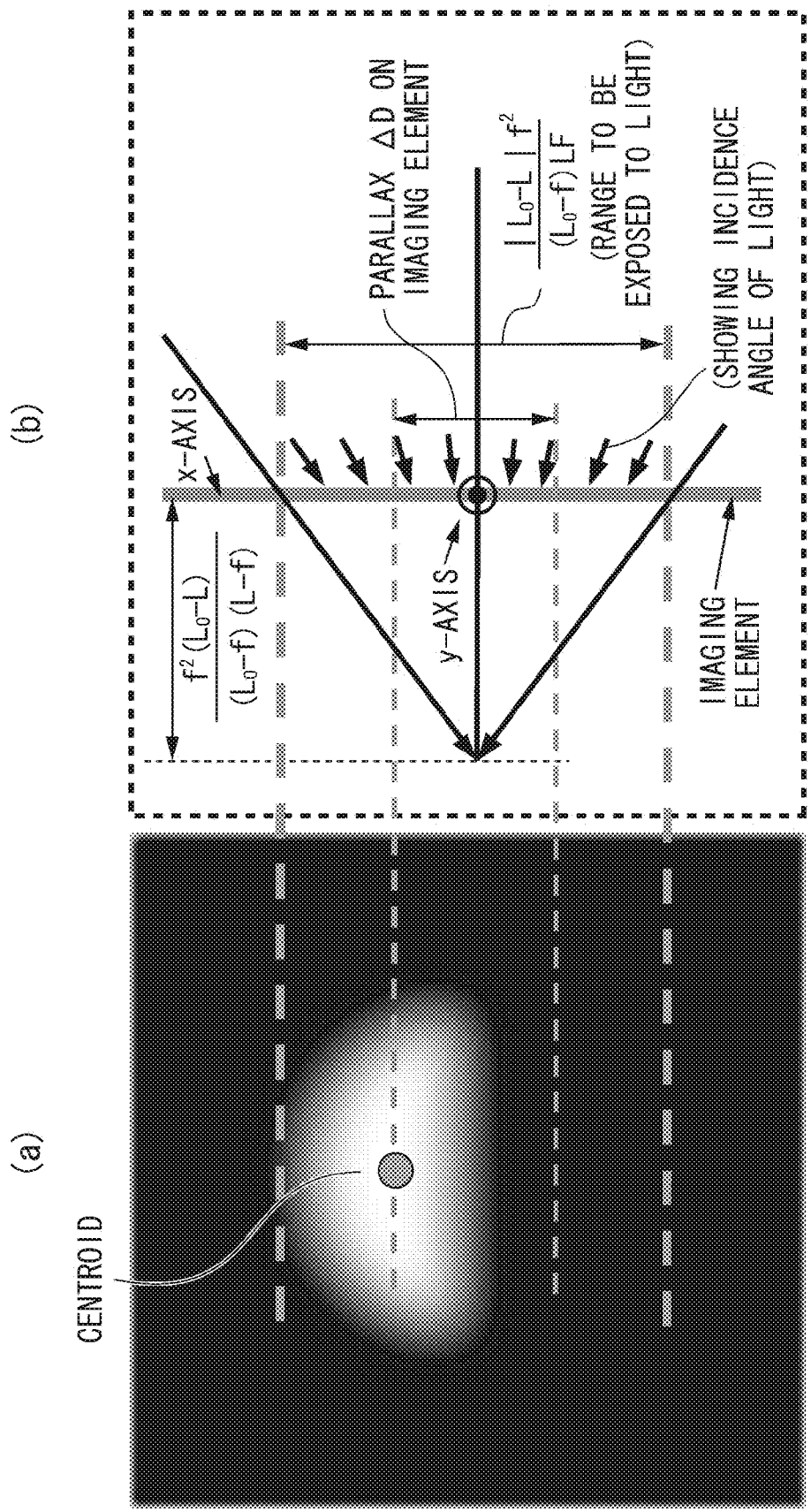
FIG. 9 is an enlarged view of the principal part of FIG. 8 and a diagram showing the semilunar filter.

Here, in [Formula 1] and [Formula 2], as shown in FIG. 8, f [mm] represents the actual focal length, F represents the diaphragm value, $L_0$ [mm] represents the focusing length to the just-focus position, and L [mm] represents the length to a subject. Further, ΔD can be expressed as a predetermined ratio to R, using ρ(F), which is a function in terms of F. Therefore, if ΔD is known, it is possible to know the value of R and the radius and distribution of a currently applied semilunar filter.

the (a) and (b) portions of FIG. 9 are enlarged views of the semilunar filter and the vicinity of the imaging surface in FIG. 8, respectively. Note that the formulas shown in FIG. 8 and FIG. 9 can be derived from the lens equation and the geometric relation.

Figure 10:
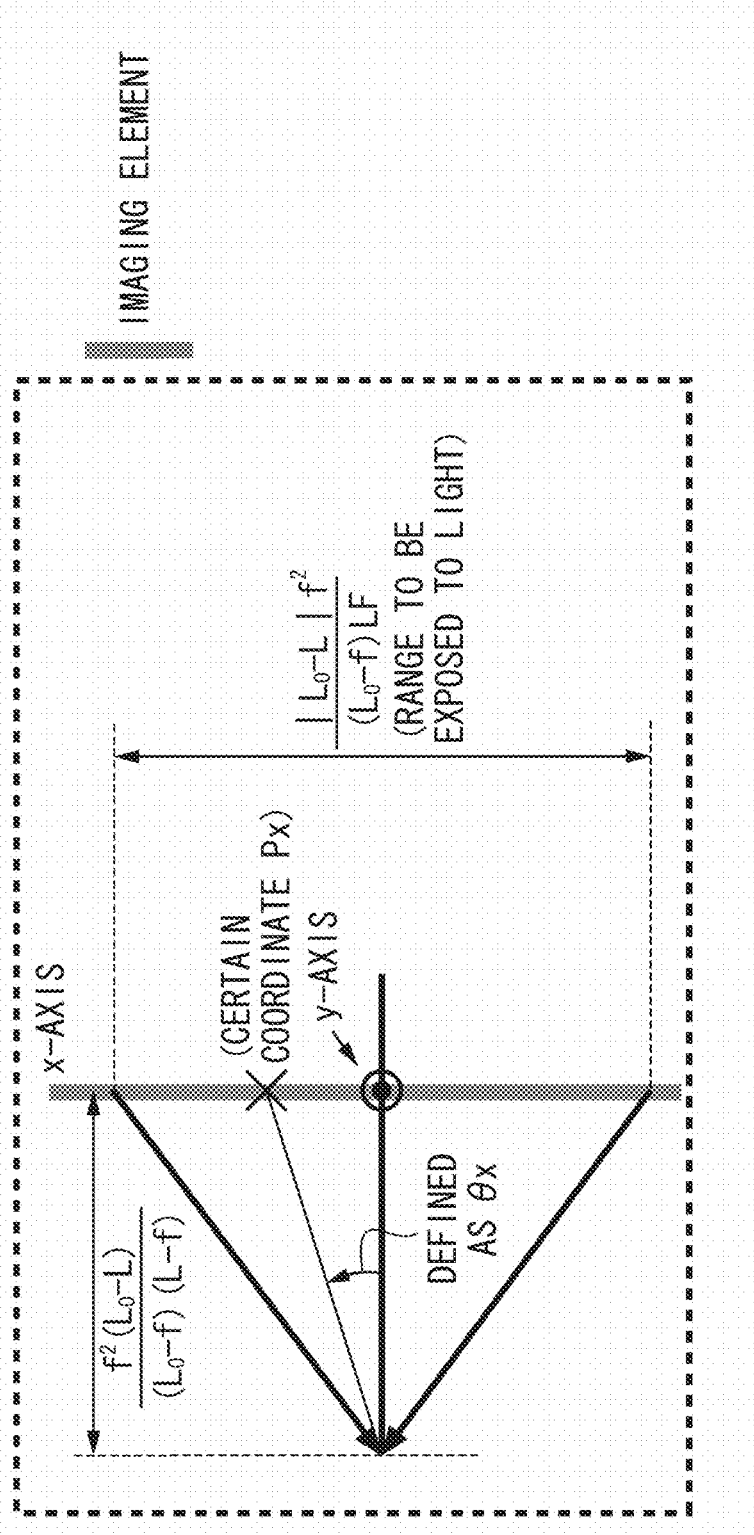
FIG. 10 is an enlarged view of the principal part of FIG. 8 and shows the relationship between the coordinate on the imaging element and the incidence angle.

Further, in the calculation of the filter coefficient of the semilunar filter, as shown in FIG. 10, when certain coordinates are (Px, Py) and the incidence angle of light to the coordinates (Px, Py) is (θx, θy), (θx, θy) shown in [Formula 4] is determined for (x, y) shown in the following [Formula 3].

$$x^2 + y^2 \leq \left(\frac{|L_o - L|f^2}{2(L_o - f)LF}\right)^2 \quad \text{[Formula 3]}$$

$$(\theta_x, \theta_y) = \left(\frac{180}{\pi}\tan^{-1}\left(\frac{2(L_o - f)(L - f)P_x}{f^2|L_o - L|}\right) \cdot \frac{180}{\pi} \right. \quad \text{[Formula 4]}$$
$$\left. \tan^{-1}\left(\frac{2(L_o - f)(L - f)P_y}{f^2|L_o - L|}\right)\right)$$

Based on the incidence angle (θx, θy) determined by [Formula 4], the filter coefficient of the semilunar filter is calculated by substituting the sensitivity characteristic for each angle shown in the (c) portion of FIG. 7. On this occasion, it is preferable to divide each filter coefficient by the sum total of the filter coefficients, and thereby normalize the filter coefficient.

In the above way, the left and right semilunar filters are created for each parallax ΔD, and are stored in the ROM (EEPROM) 47, in association with the parallax ΔD. The creation of the semilunar filters may be previously performed in the digital signal processing unit 24, and the created semilunar filters may be stored in the ROM 47. Alternatively, the semilunar filters separately created in the exterior may be stored in the ROM 47.

Further, in [Formula 1], the parallax ΔD is expressed as an absolute value, but between the parallax of a front object to the focusing length $L_0$ and the parallax of a depth-side object to the focusing length $L_0$, the parallax directions (signs) are opposite. Therefore, the left and right semilunar filters are created for each magnitude of the parallax and for each parallax direction, and stored in the ROM 47.

Figure 11:
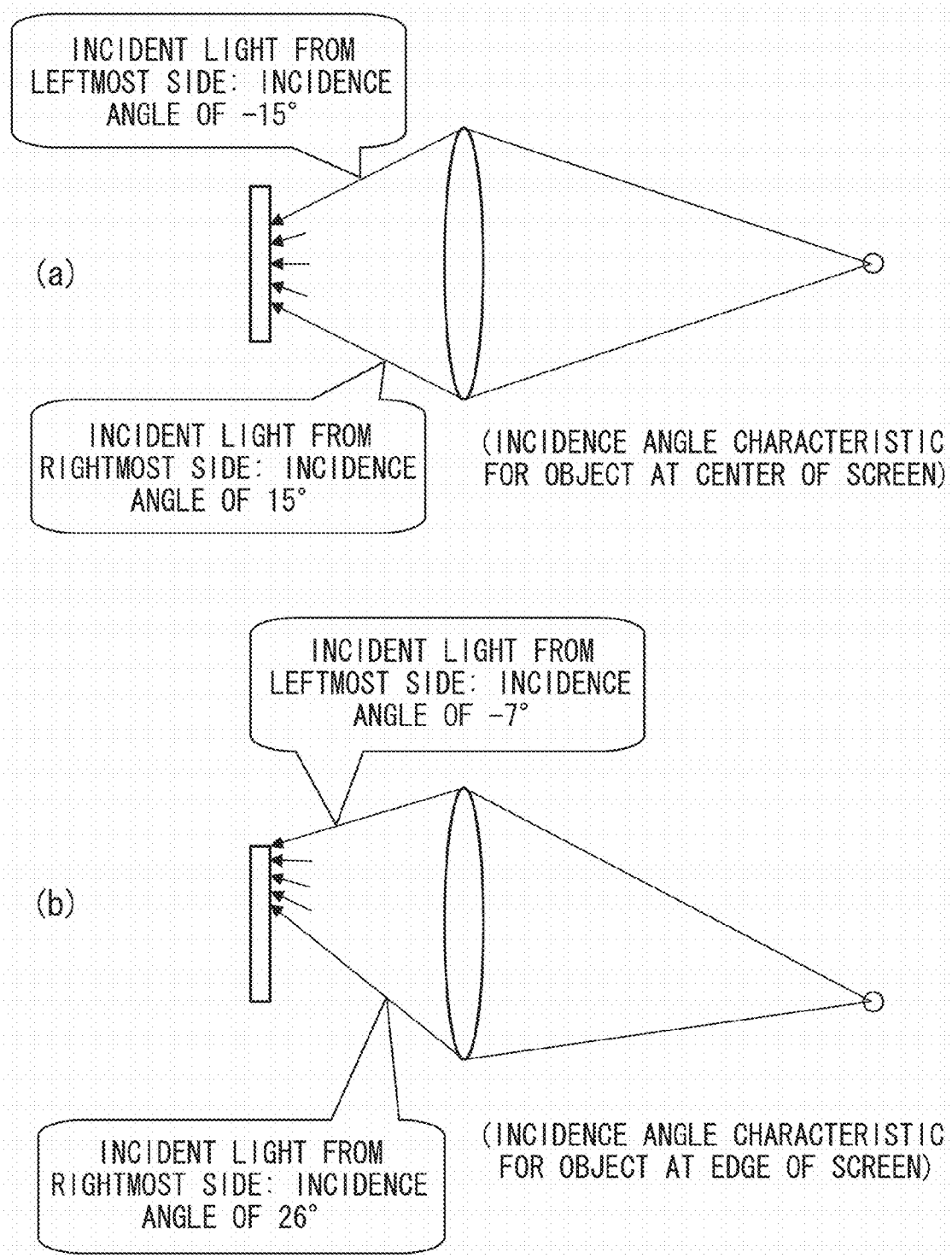
FIG. 11 is a diagram to be used for explaining the difference in incidence angle characteristic depending on the position in a screen.

By the way, as shown in the (a) and (b) portions FIG. 11, the incidence angle for an object at the center of the screen and the incidence angle for an object at the edge of the screen are different. For example, the incidence angle for the object at the center of the screen is −15° to 15°, while the incidence angle for the object at the edge of the screen is −7° to 26°.

Figure 12:
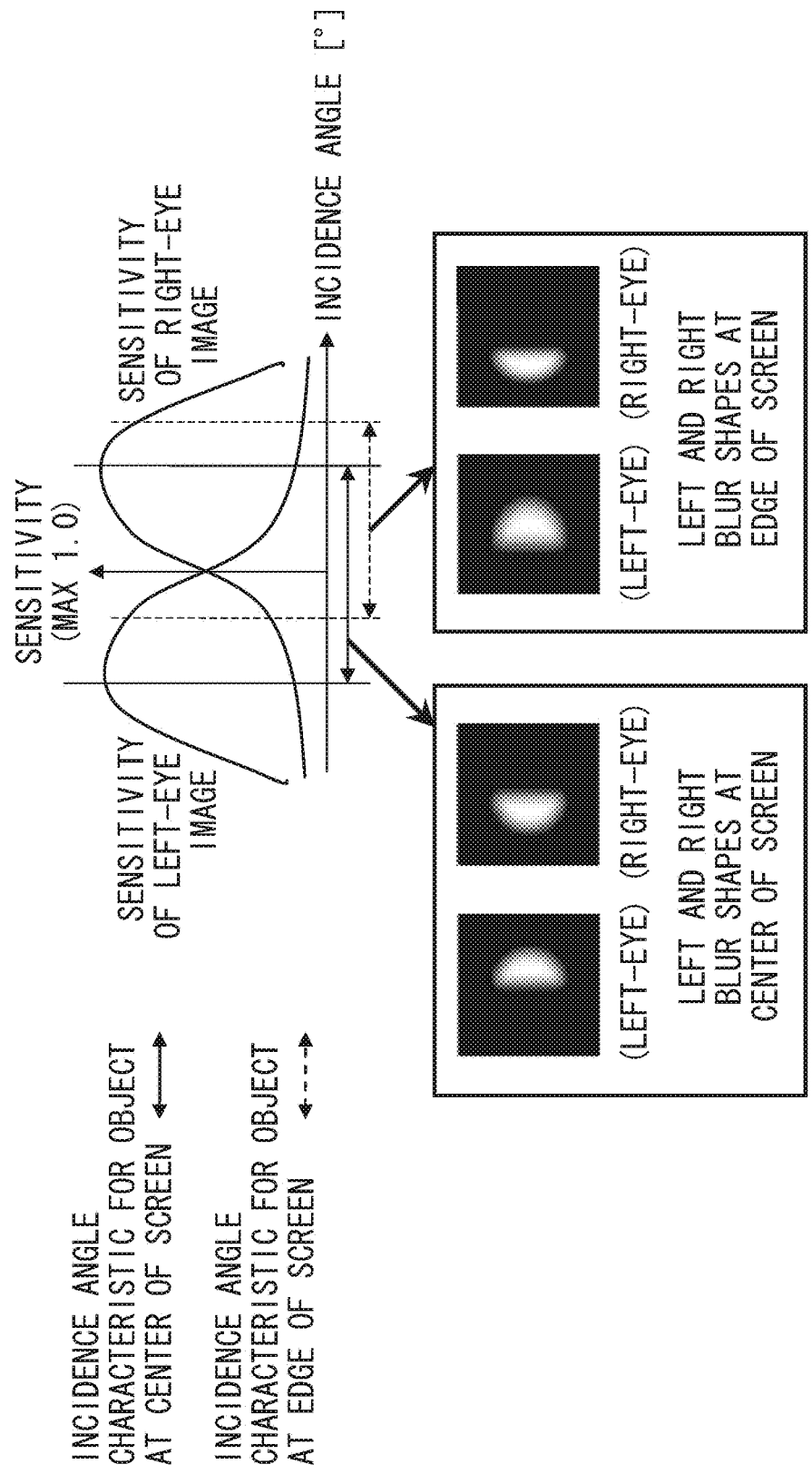
FIG. 12 is a diagram showing the difference in semilunar filters due to the difference in incidence angle characteristic shown in FIG. 11.

Thereby, as shown in FIG. 12, the incidence angle characteristics for the left-eye image and right-eye image of an object at the center of the screen are symmetric, while the incidence angle characteristics for the left-eye image and right-eye image of an object at the edge of the screen are not symmetric. As a result, the left and right semilunar filters for an object at the center of the screen have a left-right symmetry, while the left and right semilunar filters for an object at the edge of the screen are different in shape.

Therefore, it is preferable to store semilunar filters whose shapes are different depending on the position in the screen.

Further, as the monocular 3D imaging element 210 for the calculation of the above semilunar filters, a monocular 3D imaging element reflecting an arbitrary characteristic can be applied. Thereby, it is possible to calculate semilunar filters that give an appropriate parallax and blurring amount, assuming an ideal monocular 3D imaging element. Further, the calculation of the semilunar filters that give the parallax and blurring amount depending on the F-value of the lens, other than the characteristic of the imaging element, is also possible.

[Embodiment of Image Processing Method]

Figure 13:
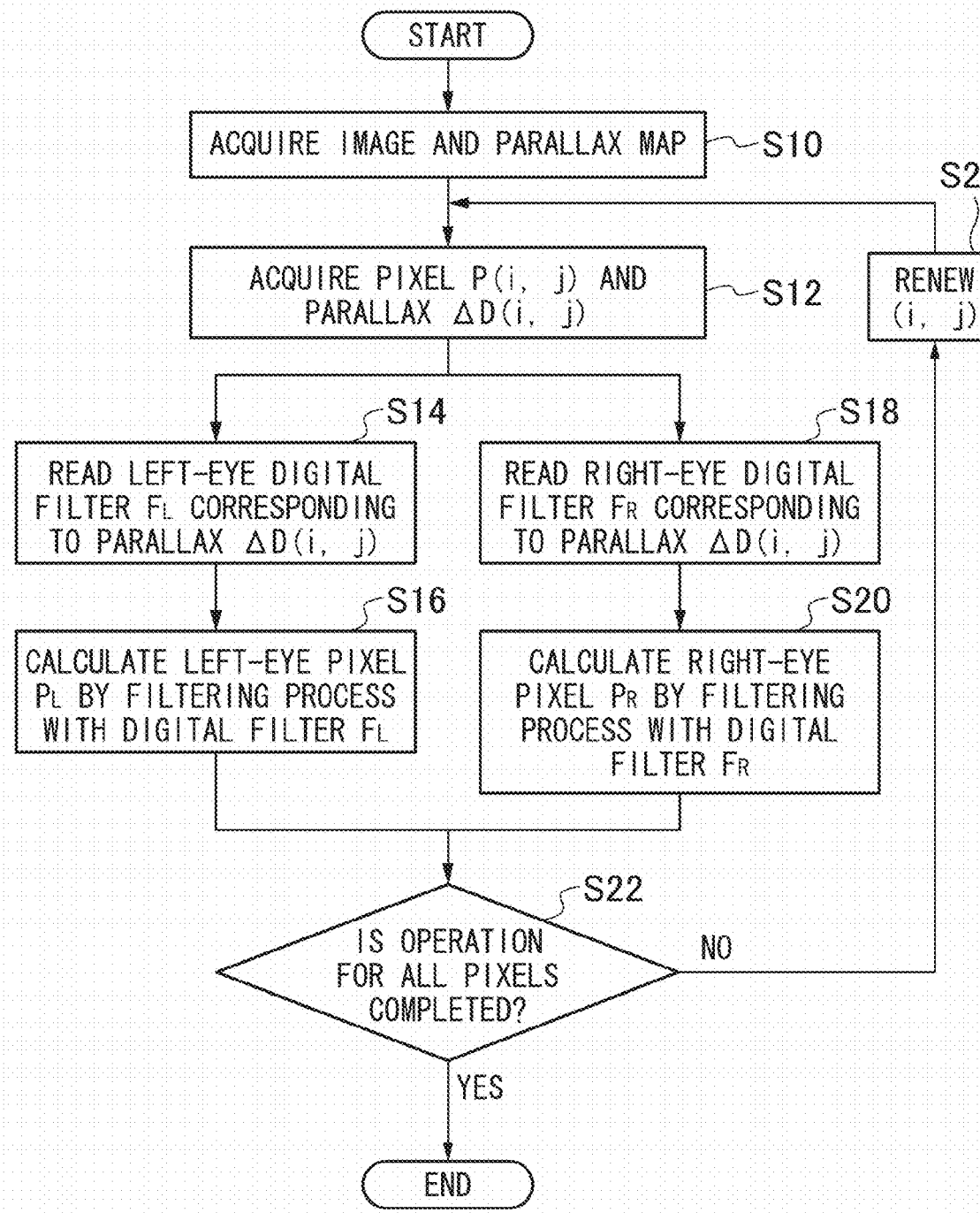
FIG. 13 is a flowchart showing an embodiment of an image processing method according to the present invention.

FIG. 13 is a flowchart showing an embodiment of an image processing method according to the present invention.

In FIG. 13, the image (2D image) to which a parallax is to be given, and the parallax map are acquired (step S10). As the image to be acquired, an image (2D image) that is picked up by the imaging device 10 when the stereoscopic image taking mode is set may be acquired, or an image that is appropriately selected from images stored in the memory card 54 may be acquired.

Figure 14:
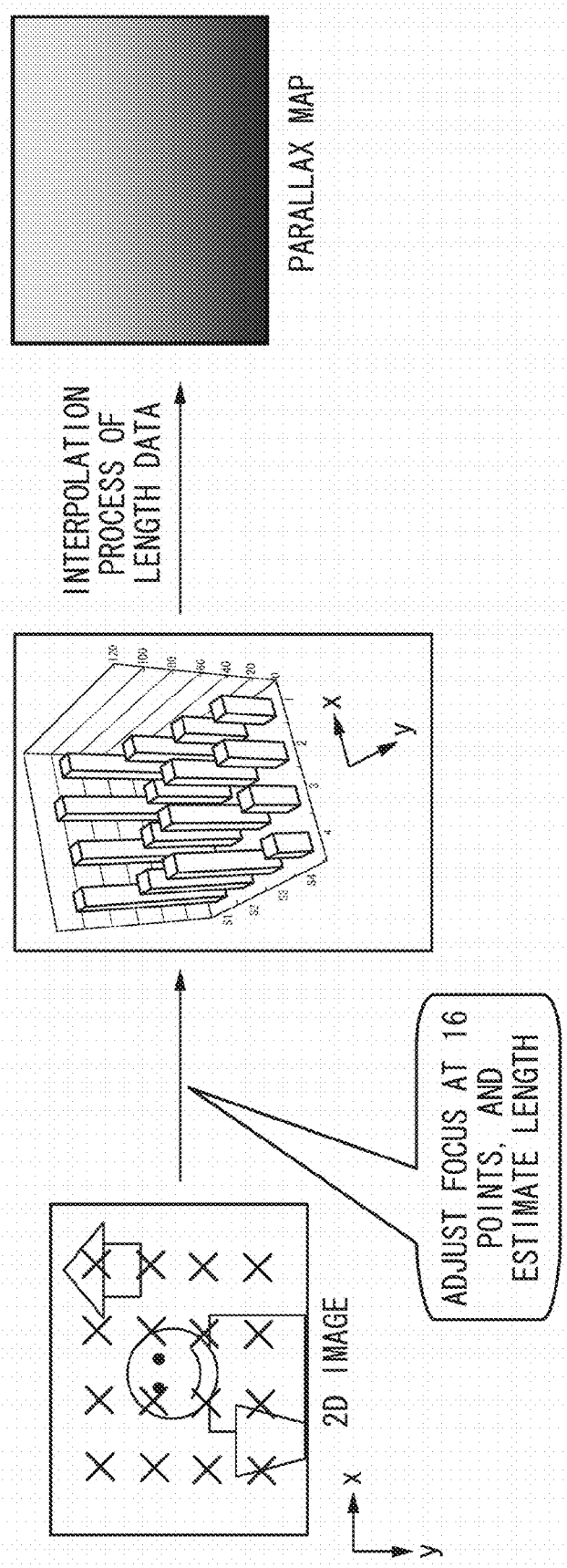
FIG. 14 is a diagram showing an example of the creation method of a parallax map.

FIG. 14 is a diagram showing an example of the creation method of the parallax map. As shown in FIG. 14, the multi-point length measurement is performed at the time of taking the 2D image. Concretely, by the AF processing unit 42, the whole screen is divided into multiple regions (in the example of FIG. 14, sixteen regions), the contrast AF is performed for each of the divided regions, and the length from the lens position to maximize the AF evaluation value to each of sixteen regions is estimated for each of the divided regions. Further, the focusing length $L_0$ at the time of the actual image-taking is also determined. Subsequently, the interpolation of length data for each length to sixteen regions is performed, and length data (length map) for the whole screen are created. After the length L for each pixel in the screen and the focusing length $L_0$ are obtained, the parallax ΔD can be calculated by [Formula 1]. Thereby, the parallax map can be created. Note that the parallax map may be created by calculating the parallaxes ΔD for sixteen regions and thereafter performing the interpolation of the calculated parallaxes ΔD.

Further, when the parallax map is created from the length map, the conversion may be performed based on an appropriate function, instead of [Formula 1]. In the case, it is preferable that the function be a linear or nonlinear function in which the parallax for the focusing length $L_0$ is zero, the parallax for the infinity is the maximum value a of the distant-side parallax, and the parallax for the proximal end is the maximum value b of the close-side parallax.

In step S10, the parallax map created in the above way is acquired.

Subsequently, a pixel P(i, j) in the acquired image is acquired, and a parallax ΔD(i, j) corresponding to the pixel P(i, j) is acquired from the parallax map (step S12).

Next, a left-eye semilunar filter $F_L$ corresponding to the magnitude and parallax direction of the acquired parallax ΔD(i, j) is read from the ROM 47 (step S14), and the convolution operation between the read semilunar filter $F_L$ and the pixel values of a pixel group that is centered on the pixel P(i, j) and has a filter size of the semilunar filter $F_L$ is performed. Thereby, a left-eye pixel $P_L$ corresponding to the pixel P(i, j) is calculated (step S16).

Similarly, a right-eye semilunar filter FL corresponding to the magnitude and parallax direction of the acquired parallax ΔD(i, j) is read from the ROM 47 (step S18), and the convolution operation between the read semilunar filter $F_R$ and the pixel values of a pixel group that is centered on the pixel P(i, j) and has a filter size of the semilunar filter $F_R$ is performed. Thereby, a left-eye pixel $P_R$ corresponding to the pixel P(i, j) is calculated (step S20).

Subsequently, whether the process for all the pixels of the 2D image is completed is discriminated (step S22). In the case where it is not completed (in the case of "No"), the position (i, j) of the pixel P(i, j) is renewed (step S24), and the transition to step S12 is performed.

On the other hand, in the case where the process for all pixels of the 2D image is completed (in the case of "Yes"), the process of generating the left-eye image and the right-eye image from the 2D image is completed.

The left-eye image and right-eye image generated in this way form the same image as a monocular 3D image to be picked up by a monocular 3D imaging device.

The monocular 3D image generated in the above way can be viewed as a 3D image, and has the following advantages (1) and (2).

(1) By preparing appropriate first and second digital filter groups, it is possible to perform an adjustment such that the blurring degree and the parallax are equivalent to an intended image sensor, for example, such that they are equivalent to the full size, the APS or the like.

(2) In a state in which the monocular 3D image is screened on a 3D television, even when a person not wearing dedicated glasses watches it, a double image hardly appears, and it can be viewed as a 2D image.

[Alternative Embodiment of Parallax Map]

The parallax map is not limited to the case of being created based on length data surveyed at the time of taking a 2D image, and a simplified parallax map that is previously defined may be applied.

For example, a parallax map in which the parallax is defined such that the parallax in the jumping-out direction increases as closing to the bottom of an image to which the parallax is to be given and in which the parallax is defined such that the parallax in the depth direction increases as closing to the top can be applied.

Figure 15:
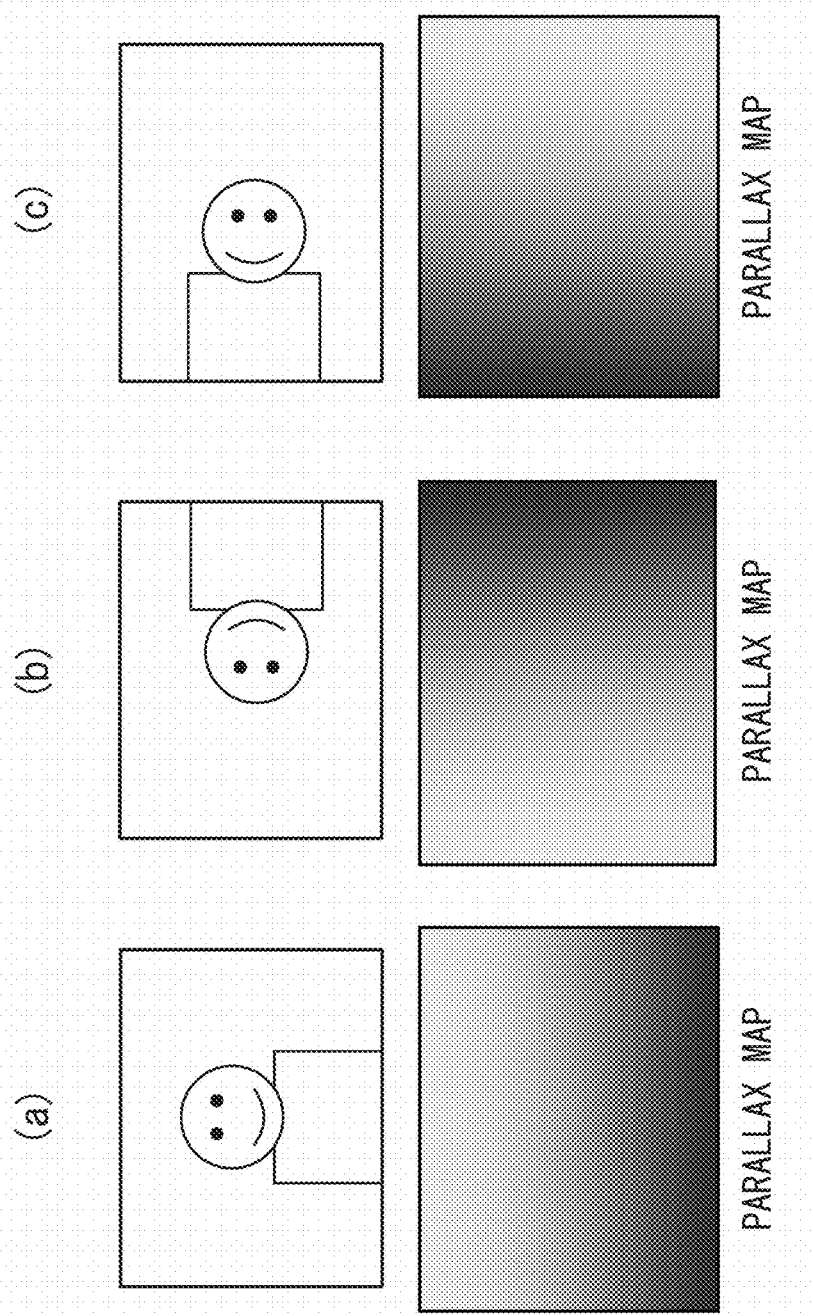
FIG. 15 is a diagram showing parallax maps that are applied depending on the top-bottom direction of an image.

In this case, it is necessary to comprehend the current attitude of the camera (the top-bottom direction of the taken image) using the information from a gravity sensor, a gyroscope or the like, and to apply a parallax map corresponding to the top-bottom direction of the image, as shown in the (a) to (c) portions of FIG. 15.

[Further Alternative Embodiment of Parallax Map]

Recently, a technique of taking a miniature-like 2D photograph is known. In this technique, the tilt of a camera is deviated, and thereby, the top part and bottom part of a screen are intentionally blurred. The output by this method is a 2D image.

Figure 16:
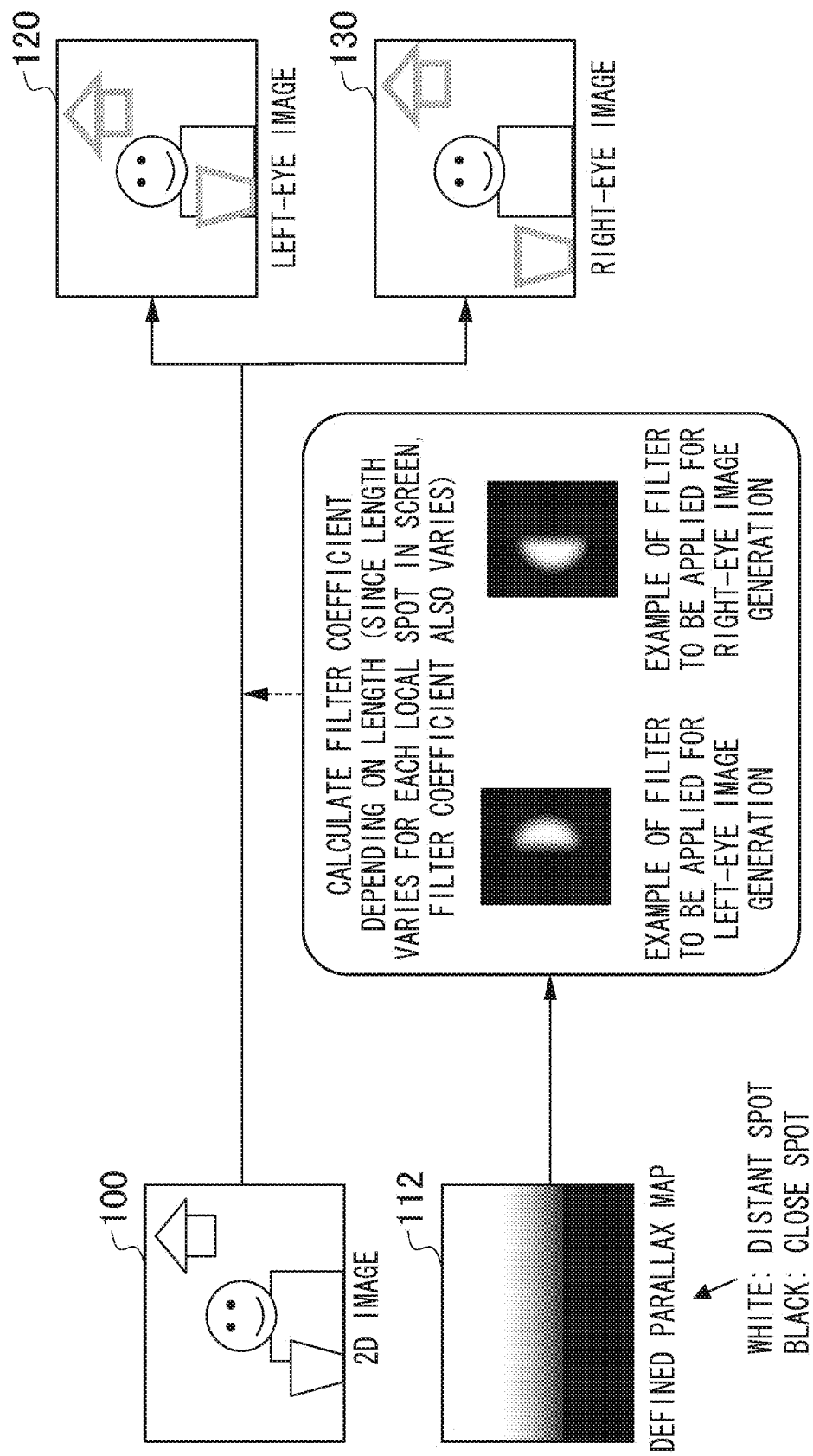
FIG. 16 is a conceptual diagram showing an image processing method for generating a miniature-like 3D image from a 2D image.

When a miniature-like 3D photograph is taken, a parallax map in which the parallaxes at the distant spot and close spot (the top part and bottom part of the screen) are extremely increased and the parallax at the central spot is decreased is defined, as a parallax map shown in FIG. 16. By this parallax map 112, it is possible to remarkably blur the top part and bottom part of the screen intentionally, and to generate a miniature-like photograph. Further, since the parallax is given, it is possible to generate a miniature-like photograph that can be viewed as a 3D, as well as a 2D.

As a portable terminal device that is an alternative embodiment of the imaging device 10, for example, there are a portable telephone, a smart phone having a camera function, a PDA (Personal Digital Assistants), and a portable game machine. In the following, to take a smart phone as an example, the details are explained with reference to the drawings.

<Configuration of Smart Phone>

Figure 17:
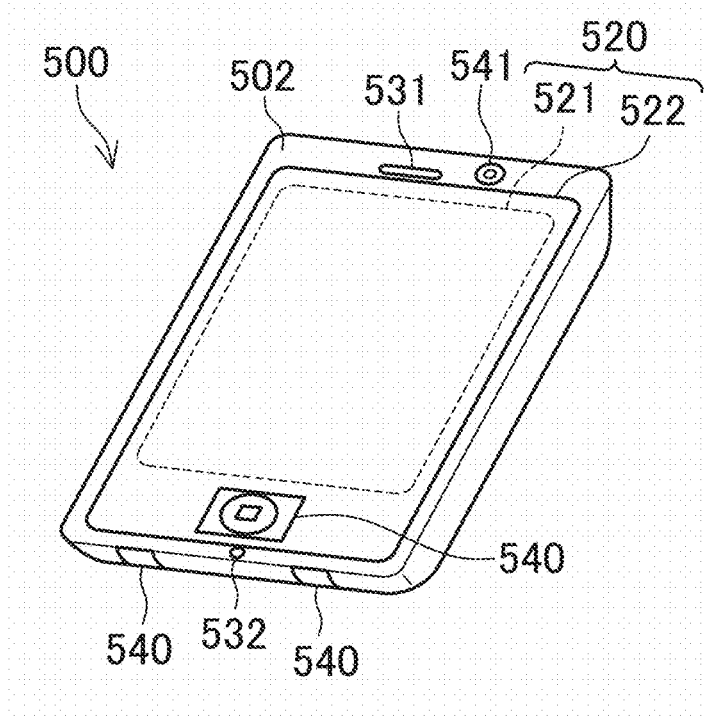
FIG. 17 is an external view of a smart phone that is an alternative embodiment of the imaging device.

FIG. 17 shows an external view of a smart phone 500 that is an alternative embodiment of the imaging device 10. The smart phone 500 shown in FIG. 17 has a case 502 in a flat plate shape, and, on one surface of the case 502, includes a display/input unit 520 in which a display panel 521 as a display unit and an operation panel 522 as an input unit are unified. Further, the case 502 is provided with a speaker 531, a microphone 532, an operation unit 540 and a camera unit 541. Here, the configuration of the case 502 is not limited to this. For example, a configuration in which the display unit and the input unit are separated can be adopted, or a configuration of having a folding structure or a sliding mechanism can be adopted.

Figure 18:
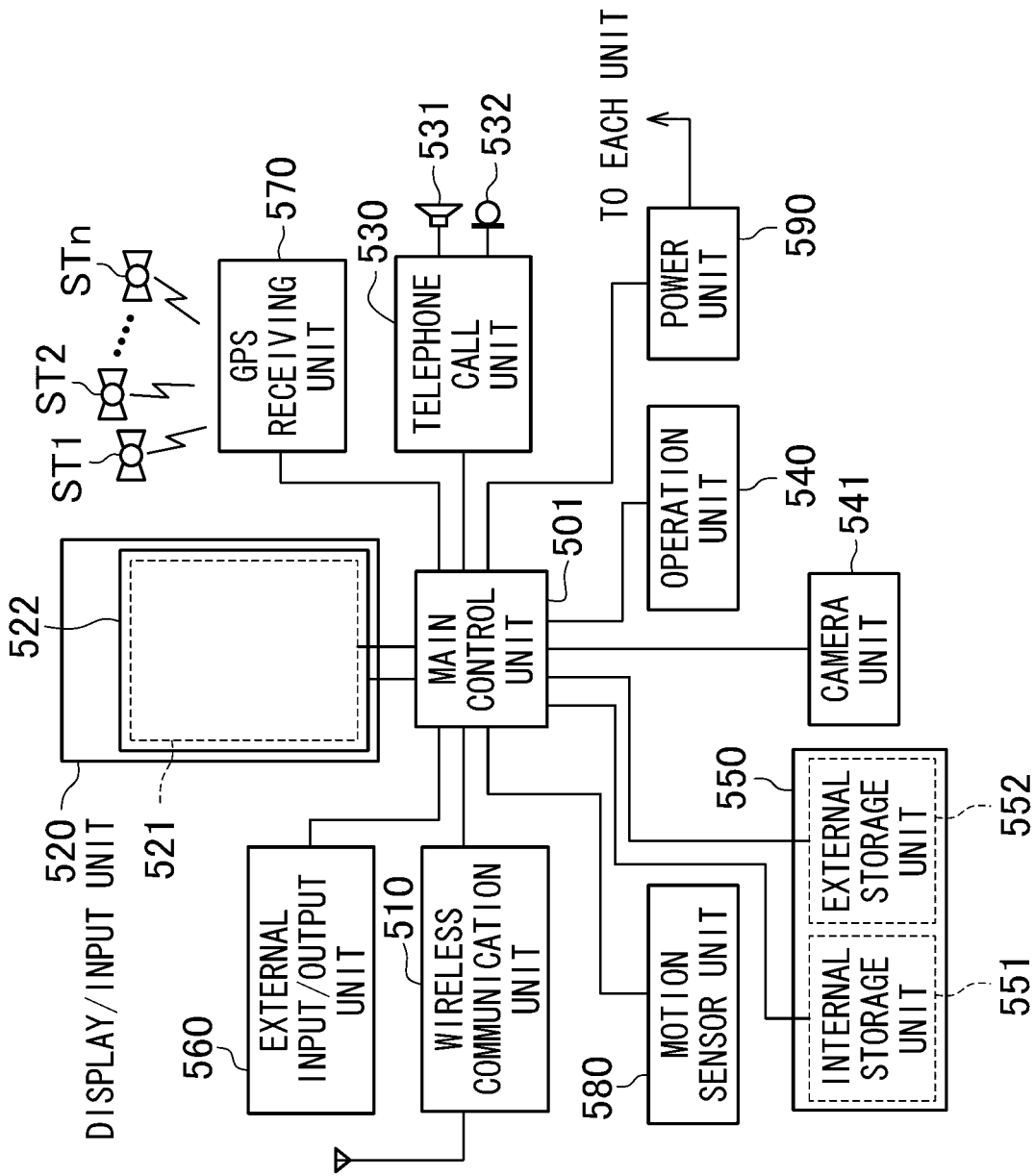
FIG. 18 is a block diagram showing the configuration of the principal part of the smart phone.

FIG. 18 is a block diagram showing the configuration of the smart phone 500 shown in FIG. 17. As shown in FIG. 18, the smart phone includes a wireless communication unit 510, the display/input unit 520, a telephone call unit 530, the operation unit 540, the camera unit 541, a storage unit 550, an external input/output unit 560, a GPS (Global Positioning System) receiving unit 570, a motion sensor unit 580, a power unit 590, and a main control unit 501, as the main constituent elements. Further, the smart phone 500 has a wireless communication function to perform the mobile wireless communication through a base station device BS and a mobile communication network NW, as the main function.

The wireless communication unit 510 performs a wireless communication with a base station device BS contained in a mobile communication network NW, in accordance with an instruction of the main control unit 501. Using the wireless communication, the sending and receiving of various file data such as audio data and image data, e-mail data or the like, and the receiving of Web data, streaming data or the like are performed.

The display/input unit 520 is a so-called touch panel that, by the control from the main control unit 501, displays an image (a still image and a moving image), character information or the like to visually transmit the information to a user, and therewith, detects the user operation to the displayed information, and includes the display panel 521 and the operation panel 522. In the case of viewing a generated 3D image, it is preferable that the display panel 521 be a 3D display panel.

The display panel 521 is an LCD (Liquid Crystal Display), an OELD (Organic Electro-Luminescence Display) or the like that is used as a display device. The operation panel 522 is a device that is placed such that an image to be displayed on the display surface of the display panel 521 can be visually recognized and that detects a single or multiple coordinates to be operated by a finger of a user or a stylus. When this device is operated by a finger of a user or a stylus, a detection signal generated due to the operation is output to the main control unit 501. Next, the main control unit 501 detects the operation position (coordinate) on the display panel 521, based on the received detection signal.

As shown in FIG. 17, the display panel 521 and operation panel 522 of the smart phone 500 are unified to constitute the display/input unit 520, and are arranged such that the operation panel 522 completely covers the display panel 521. In the case of adopting this arrangement, the operation panel 522 may have the function to detect the user operation, also in the region outside the display panel 521. In other words, the operation panel 522 may include a detection region that is the superposition part overlapping with the display panel 521 (hereinafter, referred to as a display region), and a detection region that is other than it and that is the outer edge part not overlapping with the display panel 521 (hereinafter, referred to as a non-display region).

Here, the size of the display region and the size of the display panel 521 may accord completely, but both does not always need to accord. Further, the operation panel 522 may include two sensitive regions: the outer edge part and the inner part that is other than it. Moreover, the width of the outer edge part is appropriately designed depending on the size of the case 502 and the like. Furthermore, examples of the position detection scheme to be adopted in the operation panel 522 include a matrix switch scheme, a resistive film scheme, a surface acoustic wave scheme, an infrared ray scheme, an electromagnetic induction scheme and an electrostatic capacity scheme, and any scheme can be adopted.

The telephone call unit 530, which includes the speaker 531 and the microphone 532, converts a user voice input through the microphone 532 into audio data capable of being processed in the main control unit 501, to output it to the main control unit 501, and decodes audio data received by the wireless communication unit 510 or the external input/output unit 560, to output it from the speaker 531. Further, as shown in FIG. 17, for example, the speaker 531 can be mounted on the same surface as a surface on which the display/input unit 520 is provided, and the microphone 532 can be mounted on the side surface of the case 502.

The operation unit 540 is a hardware key using a key switch or the like, and receives an instruction from a user. For example, as shown in FIG. 18, the operation unit 540, which is mounted on the lower surface below the display unit of the case 502 of the smart phone 1, is a push-button switch that is turned on when being pushed by a finger or the like and becomes the off state by the restring force of a spring or the like when the finger is released.

The storage unit 550 stores a control program and control data of the main control unit 501, application software including the image process program for generating the left-eye image and right-eye image according to the present invention, the first and second digital filter groups to be used for generating a stereovision image, the parallax map, address data associated with the name, telephone number and others of a communication partner, sent or received e-mail data, Web data downloaded by Web browsing, and downloaded content data, and further, temporarily stores streaming data or the like. Further, the storage unit 550 is constituted by an internal storage unit 551 built in the smart phone, and an external storage unit 552 having a detachable external memory slot. Here, each of the internal storage unit 551 and the external storage unit 552 that constitute the storage unit 550 is implemented by using a storing medium such as a flash memory type memory, a hard disk type memory, multimedia card micro type memory, card type memory (for example, Micro SD (R) memory or the like), a RAM (Random Access Memory), or a ROM (Read Only Memory).

The external input/output unit 560 plays a role as an interface to all external apparatuses that is linked with the smart phone 500, and is directly or indirectly connected with another external apparatus, through a communication (for example, the universal serial bus (USB), IEEE1394 or the like), or a network (for example, the internet, a wireless LAN, Bluetooth (R), RFID (Radio Frequency Identification), the infrared communication (Infrared Data Association: IrDA) (R), UWB (Ultra Wideband) (R), ZigBee (R), or the like).

Examples of the external apparatus to be linked with the smart phone 500 include a wired or wireless headset, a wired or wireless external battery charger, a wired or wireless data port, a memory card or SIM (Subscriber Identity Module Card)/UIM (User Identity Module Card) card to be connected through a card socket, an external audio and video apparatus to be connected through an audio and video I/O (Input/Output) terminal, an external audio and video apparatus to be connected by wireless, a smart phone to be connected by wire or wirelessly, a personal computer to be connected by wire or wirelessly, a PDA to be connected by wire or wirelessly, a personal computer to be connected by wire or wirelessly, an earphone, and the like. The external input/output unit allows data transferred from such an external apparatus to be transmitted to each constituent element in the interior of the smart phone 500, and allows data in the interior of the smart phone 500 to be transferred to an external apparatus.

The GPS receiving unit 570, in accordance with an instruction of the main control unit 501, receives GPS signals sent from GPS satellites ST1 to STn, executes a positioning operation process based on the multiple GPS signals received, and detects the position of the smart phone 500 by the latitude, longitude and altitude. When the position information can be acquired from the wireless communication unit 510 or the external input/output unit 560 (for example, a wireless LAN), the GPS receiving unit 570 can detect the position using the position information.

The motion sensor unit 580 includes, for example, a three-axis acceleration sensor and the like, and detects the physical motion of the smart phone 500 in accordance with an instruction of the main control unit 501. The detection of the physical motion of the smart phone 500 leads to the detection of the moving direction and acceleration of the smart phone 500. This detection result is output to the main control unit 501.

The power unit 590 supplies the electric power stored in a battery (not shown in the figure), to each unit of the smart phone 500, in accordance with an instruction of the main control unit 501.

The main control unit 501, which includes a microprocessor, operates in accordance with the control program and control data stored in the storage unit 550, and integrally controls each unit of the smart phone 500. Further, the main control unit 501 has a mobile communication control function to control each unit of the communication system, and an application processing function, for performing a voice communication and a data communication through the wireless communication unit 510.

The main control unit 501 operates in accordance with the application software stored in the storage unit 550, and thereby, the application processing function is implemented. Examples of the application processing function include an infrared communication function to perform the data communication with a facing apparatus by controlling the external input/output unit 560, an e-mail function to perform the sending and receiving of an e-mail message, a Web browsing function to browse a Web page, a function to generate a 3D image from a 2D image according to the present invention, and the like.

Further, the main control unit 501 has an image processing function such as the display of a picture to the display/input unit 520, based on image data (still image or moving image data) such as received data or downloaded streaming data. The image processing function is a function by which the main control unit 501 decodes the above image data, performs an image process to the decoded result, and displays the image to the display/input unit 520.

Moreover, the main control unit 501 executes the display control to the display panel 521, and the operation detection control for detecting a user operation through the operation unit 540 or the operation panel 522.

By the execution of the display control, the main control unit 501 displays software keys such as an icon for activating application software and a scroll bar, or displays a window for composing an e-mail message. Here, the scroll bar is a software key for receiving an instruction to move the display part of an image that is too large to fit inside the display region of the display panel 521, or the like.

Further, by the execution of the operation detection control, the main control unit 501 detects a user operation through the operation unit 540, receives an operation to the above icon and an input of a character string to an input box of the above window, or receives a scroll request of the display image through the scroll bar.

Moreover, by the execution of the operation detection control, the main control unit 501 has an operation touch panel control function to decide whether the operation position to the operation panel 522 is the superposition part (display region) overlapping with the display panel 521 or, other than it, the outer edge part (non-display region) not overlapping with the display panel 521, and to control the sensitive region of the operation panel 522 and the display position of the software keys.

Further, the main control unit 501 can detect a gesture operation to the operation panel 522, and can execute a previously set function in response to the detected gesture operation. The gesture operation device not a conventional simple touch operation, but an operation to draw a track from at least one of multiple positions by drawing the track by a finger or the like, by designating multiple positions simultaneously, or by combining them.

The camera unit 541 is a digital camera that performs an electronic image-taking using an imaging element such as a CMOS (Complementary Metal Oxide Semiconductor) or a CCD (Charge-Coupled Device). Further, by the control of the main control unit 501, the camera unit 541 can convert image data obtained by the imaging, into compressed image data such as JPEG (joint Photographic coding Experts Group), for example, and can record them in the storage unit 550, or output them through the external input/output unit 560 or the wireless communication unit 510. In the smart phone 500 shown in FIG. 17, the camera unit 541 is mounted on the same surface as the display/input unit 520. However, the mount position of the camera unit 541 is not limited to this, and it may be mounted on the back surface of the display/input unit 520. Alternatively, multiple camera units 541 may be mounted. Here, in the case where the multiple camera units 541 are mounted, it is possible to switch a camera unit 541 to be used for an image taking to perform the image taking independently, and to use the multiple camera units 541 simultaneously to perform an image taking.

Further, the camera unit 541 can be utilized for various functions of the smart phone 500. For example, an image acquired by the camera unit 541 can be displayed on the display panel 521, and an image of the camera unit 541 can be utilized as one operation input of the operation panel 522. Further, when the GPS receiving unit 570 detects the position, it can detect the position by referring to an image from the camera unit 541. Moreover, by referring to an image from the camera unit 541, it is possible to decide the optical axis direction of the camera unit 541 of the smart phone 500, and to decide the current usage environment without using a three-axis acceleration sensor or using a three-axis acceleration sensor together. Naturally, it is possible to utilize an image from the camera unit 541 within the application software.

In addition, it is possible to add the position information acquired by the GPS receiving unit 570, the voice information acquired by the microphone 532 (it may be the text information after the voice-text conversion by the main control unit or the like), the attitude information acquired by the motion sensor unit 580, or the like, to image data of still image or moving image, to store them in the storage unit 550, and to output them through the external input/output unit 560 or the wireless communication unit 510.

[Addition]

The present invention is not limited to the case of creating a 3D still image from a 2D still image, and can be applied to the case of creating a 3D moving image from a 2D moving image.

Further, in this embodiment, the semilunar filters are previously created and stored for each of the parallaxes (including their signs), but, without being limited to this, the left and right semilunar filters may be created and stored only for each of the parallaxes in one parallax direction. In this case, for giving the parallax in the other direction, the left and right semilunar filters are reversed and then are applied.

Moreover, since the left and right semilunar filters have a left-right symmetry, only any one of the left and right semilunar filters may be stored as the semilunar filter, and the mirror-reversed semilunar filter may be applied as the other semilunar filter.

Further, the length information acquisition device configured to acquire the parallax information is not limited to a device configured to perform the contrast AF for each of multiple regions of a taken image, and for example, may be a device configured to use an infrared sensor for estimating the length from the time difference by the reflection in infrared-ray irradiation.

Moreover, the parallax detection device configured to acquiring the parallax information may be a device configured to using a phase-difference imaging element that includes phase-difference sensors at multiple regions in the imaging surface and detecting the parallax from the phase deviation, or a device configured to using a compound-eye camera that includes two sets of imaging device and detecting the parallax by the stereo matching of two picked-up images.

Further, by recognizing a person as the main subject from a 2D image, or by recognizing objects such as the ground, the background and a building, from a 2D image, using a known object recognition technology, a parallax map to which parallaxes corresponding to the objects are given may be created based on the recognition results. In this case, it is preferable that the parallax for the main subject be zero and the blurring process be not performed.

Moreover, the imaging device 10 and the smart phone 500 take a 2D image, and therewith, include the image processing device according to the present invention that generates a 3D image from the actually taken 2D image. However, without being limited to this, the present invention can also be applied to an image processing device (for example, a personal computer, a tablet PC or the like) that acquires a 2D image to which the giving of the parallax and the blurring process are to be performed, through an external apparatus or communications, and generates a 3D image from the acquired 2D image.

Needless to say, the present invention can be limited to the above-described embodiments, and various modifications are possible in a range without departing from the spirit of the invention.

What is claimed is:

1. An image processing device comprising:
   an image acquisition device configured to acquire an image;
   a parallax information acquisition device configured to acquire parallax information to be given to a pixel, for each pixel of the acquired image; and
   a calculation device configured to calculate a first pixel and a second pixel for each pixel of the acquired image, by performing a filtering process with a first digital filter and a second digital filter, based on a first digital filter group, a second digital filter group and the parallax information for each pixel acquired by the parallax information acquisition device, the first pixel and the second pixel being pixels to which a parallax has been given, the first digital filter and the second digital filter corresponding to the parallax information for each pixel of the acquired image, the first digital filter group and the second digital filter group being digital filter groups for giving a parallax to the acquired image and having left-right symmetry to each other, and each of the first digital filter group and the second digital filter group having filter sizes that are different depending on a magnitude of the parallax to be given,
   wherein the left-right symmetry of the first and second digital filter groups is different between a central part and an edge part of the image.

2. The image processing device according to claim 1, comprising a parallax map acquisition device configured to acquire a parallax map that indicates the parallax to be given to the acquired image,
   wherein, for each pixel of the acquired image, the parallax information acquisition device acquires the parallax information corresponding to a position of the pixel, from the parallax map.

3. The image processing device according to claim 2, wherein the first digital filter group and the second digital filter group each have normalized filter coefficients.

4. The image processing device according to claim 2, comprising a parallax map storage device configured to store a parallax map that is previously defined depending on a position on the image,
   wherein the parallax map acquisition device acquires the parallax map from the parallax map storage device.

5. The image processing device according to claim 4, wherein the first digital filter group and the second digital filter group each have normalized filter coefficients.

6. The image processing device according to claim 4, comprising a device configured to acquire information indicating a top-bottom direction of the image to which the parallax is to be given,
   wherein, in the acquisition of the parallax map from the parallax map storage device, the parallax map acquisition device acquires a corresponding parallax map, based on the information indicating the top-bottom direction of the acquired image.

7. The image processing device according to claim 6, wherein the first digital filter group and the second digital filter group each have normalized filter coefficients.

8. The image processing device according to claim 1, wherein the first digital filter group and the second digital filter group each have normalized filter coefficients.

9. An imaging device comprising:
   an imaging device including an image-taking optical system, and an imaging element on which a subject image is formed through the image-taking optical system;
   the image acquisition device configured to acquire an image that is output from the imaging device; and
   the image processing device according to claim 1.

10. The imaging device according to claim 9, comprising a length information acquisition device configured to acquire length information for each of multiple regions of a picked-up image or for each pixel of the picked-up image, when the image is picked up by the imaging device, wherein the parallax information acquisition device acquires the parallax information of the picked-up image, based on the acquired length information.

11. The imaging device according to claim 9, comprising a phase difference detection device configured to detect a phase difference for each of multiple regions of an image picked up by the imaging device or for each pixel of the image, wherein the parallax information acquisition device acquires the parallax information of the picked-up image, based on the phase difference detected by the phase difference detection device.

12. The imaging device according to claim 9, further comprising another imaging device including an image-taking optical system and an imaging element and being different from the imaging device, wherein the parallax information acquisition device acquires the parallax information of the picked-up image, based on two images picked up by the two imaging device.

13. An image processing device comprising:

an image acquisition device configured to acquire an image;
   a parallax information acquisition device configured to acquire parallax information to be given to a pixel, for each pixel of the acquired image; and
   a calculation device configured to calculate a first pixel and a second pixel for each pixel of the acquired image, by performing a filtering process with a first digital filter and a second digital filter, based on a first digital filter group, a second digital filter group and the parallax information for each pixel acquired by the parallax information acquisition device, the first pixel and the second pixel being pixels to which a parallax has been given, the first digital filter and the second digital filter corresponding to the parallax information for each pixel of the acquired image, the first digital filter group and the second digital filter group being digital filter groups for giving a parallax to the acquired image and having left-right symmetry to each other, and each of the first digital filter group and the second digital filter group having filter sizes that are different depending on a magnitude of the parallax to be given,
   wherein the first digital filter group and the second digital filter group are calculated based on a sensitivity characteristic of a single imaging element, the sensitivity characteristic depending on an incidence angle, the single imaging element being configured by a first pixel group and a second pixel group, the first pixel group and the second pixel group respectively receiving light fluxes into which light flux having passed through a single image-taking optical system is pupil-divided.

14. The image processing device according to claim 13, wherein the first digital filter group and the second digital filter group each have normalized filter coefficients.

15. An image processing device comprising:

an image acquisition device configured to acquire an image;
   a parallax information acquisition device configured to acquire parallax information to be given to a pixel, for each pixel of the acquired image; and
   a calculation device configured to calculate a first pixel and a second pixel for each pixel of the acquired image, by performing a filtering process with a first digital filter and a second digital filter, based on a first digital filter group, a second digital filter group and the parallax information for each pixel acquired by the parallax information acquisition device, the first pixel and the second pixel being pixels to which a parallax has been given, the first digital filter and the second digital filter corresponding to the parallax information for each pixel of the acquired image, the first digital filter group and the second digital filter group being digital filter groups for giving a parallax to the acquired image and having left-right symmetry to each other, and each of the first digital filter group and the second digital filter group having filter sizes that are different depending on a magnitude of the parallax to be given,
   wherein the first digital filter group and the second digital filter group have such filter coefficients that an image resulting from adding a first image and a second image does not become a double image, the first image and the second image being images to which the parallax after the filtering process by the calculation device has been given.

16. The image processing device according to claim 15, wherein the first digital filter group and the second digital filter group each have normalized filter coefficients.

17. An image processing method comprising:

an image acquisition step for acquiring an image;
   a parallax information acquisition step for acquiring parallax information to be given to a pixel, for each pixel of the acquired image; and
   a calculation step for calculating a first pixel and a second pixel for each pixel of the acquired image, by performing a filtering process with a first digital filter and a second digital filter, based on a first digital filter group, a second digital filter group and the parallax information for each pixel acquired by the parallax information acquisition step, the first pixel and the second pixel being pixels to which a parallax has been given, the first digital filter and the second digital filter corresponding to the parallax information for each pixel of the acquired image, the first digital filter group and the second digital filter group being digital filter groups for giving a parallax to the acquired image and having left-right symmetry to each other, and each of the first digital filter group and the second digital filter group having filter sizes that increase depending on at least a magnitude of the parallax to be given,
   wherein the left-right symmetry of the first and second digital filter groups is different between a central part and an edge part of the image.

18. An image processing method comprising:

an image acquisition step for acquiring an image;
   a parallax information acquisition step for acquiring parallax information to be given to a pixel, for each pixel of the acquired image; and
   a calculation step for calculating a first pixel and a second pixel for each pixel of the acquired image, by performing a filtering process with a first digital filter and a second digital filter, based on a first digital filter group, a second digital filter group and the parallax information for each pixel acquired by the parallax information acquisition step, the first pixel and the second pixel being pixels to which a parallax has been given, the first digital filter and the second digital filter corresponding to the parallax information for each pixel of the acquired image, the first digital filter group and the second digital filter group being digital filter groups for giving a parallax to the acquired image and having left-right symmetry to each other, and each of the first digital filter group and the second digital filter group having filter sizes that increase depending on at least a magnitude of the parallax to be given, wherein the first digital filter group and the second digital filter group are calculated based on a sensitivity characteristic of a single imaging element, the sensitivity characteristic depending on an incidence angle, the single imaging element being configured by a first pixel group and a second pixel group, the first pixel group and the second pixel group respectively receiving light fluxes into which light flux having passed through a single image-taking optical system is pupil-divided.

19. An image processing method comprising:

an image acquisition step for acquiring an image;

a parallax information acquisition step for acquiring parallax information to be given to a pixel, for each pixel of the acquired image; and a calculation step for calculating a first pixel and a second pixel for each pixel of the acquired image, by performing a filtering process with a first digital filter and a second digital filter, based on a first digital filter group, a second digital filter group and the parallax information for each pixel acquired by the parallax information acquisition step, the first pixel and the second pixel being pixels to which a parallax has been given, the first digital filter and the second digital filter corresponding to the parallax information for each pixel of the acquired image, the first digital filter group and the second digital filter group being digital filter groups for giving a parallax to the acquired image and having left-right symmetry to each other, and each of the first digital filter group and the second digital filter group having filter sizes that increase depending on at least a magnitude of the parallax to be given, wherein the first digital filter group and the second digital filter group have such filter coefficients that an image resulting from adding a first image and a second image does not become a double image, the first image and the second image being images to which the parallax after the filtering process.

* * * * *